United States Patent
Yamaguchi et al.

(10) Patent No.: US 6,308,115 B1
(45) Date of Patent: Oct. 23, 2001

(54) VEHICLE RUNNING CONDITION JUDGEMENT DEVICE

(75) Inventors: Hiroyuki Yamaguchi; Katsuhiro Asano, both of Aichi; Kenji Tozu, Mie; Takayuki Itoh; Akitaka Nishio, both of Aichi, all of (JP)

(73) Assignees: Kabushiki Kaisha Toyota Chuo Kenkyusho, Aichi-gun; Aishin Seiki Kabushiki Kaisha, Kariya, both of (JP)

( * ) Notice: Subject to any disclaimer, the term of this patent is extended or adjusted under 35 U.S.C. 154(b) by 0 days.

(21) Appl. No.: 09/361,996

(22) Filed: Jul. 28, 1999

(30) Foreign Application Priority Data

Jul. 29, 1998 (JP) .................................................. 10-213627
Feb. 12, 1999 (JP) .................................................. 11-034984

(51) Int. Cl.[7] ................................. G06F 7/70; G05D 1/00
(52) U.S. Cl. ................................. 701/1; 701/36; 701/73; 701/74; 303/148; 303/150; 180/197
(58) Field of Search ................................. 701/1, 36, 70, 701/69, 71, 72, 38, 41, 84, 90, 74, 80, 37, 75; 180/197, 414, 248, 412, 415; 303/148; 73/118.1

(56) References Cited

U.S. PATENT DOCUMENTS

| | | | |
|---|---|---|---|
| 4,901,811 | * | 2/1990 | Uno et al. .............................. 180/414 |
| 5,079,708 | * | 1/1992 | Brown ................................... 701/72 |
| 5,297,646 | * | 3/1994 | Yamamura et al. .................. 180/197 |
| 5,402,341 | * | 3/1995 | Liubakka et al. ..................... 180/414 |
| 5,408,411 | * | 4/1995 | Nakamura et al. ..................... 701/42 |
| 5,557,520 | * | 9/1996 | Suissa et al. ........................... 701/38 |
| 5,745,862 | * | 4/1998 | Hirano ....................................... 701/1 |
| 5,747,682 | * | 5/1998 | Hirano ................................... 73/118.1 |
| 5,762,157 | * | 6/1998 | Uehara .................................... 180/197 |
| 5,826,209 | * | 10/1998 | Matsuno ................................... 701/69 |

FOREIGN PATENT DOCUMENTS

| | | |
|---|---|---|
| 3-122541 | 5/1991 | (JP) . |
| 8-119131 | 5/1996 | (JP) . |
| 9-311042 | 12/1997 | (JP) . |
| 10-226348 | 8/1998 | (JP) . |

* cited by examiner

Primary Examiner—Jacques H. Louis-Jacques
(74) Attorney, Agent, or Firm—Oblon, Spivak, McClelland, Maier & Neustadt, P.C.

(57) ABSTRACT

A vehicle running condition judgment device for accurately detecting a change in a road surface condition and a vehicle's limit running condition. With substitution of respective tire characteristics and a detected state quantity into a vehicle motion model, vehicle slip angles are estimated for respective assumed road surface conditions. Based on the current state quantity and the last estimated vehicle slip angle, currently estimated vehicle slip angles for the respective assumed road surface conditions are compensated. A differential operation section calculates an estimation value of a vehicle slip angular velocity for each of the assumed road surface conditions based on the compensated vehicle slip angles for the respective assumed road surface conditions. Meanwhile, an operation section calculates a detection value of a vehicle slip angular velocity based on the detected state quantity. By comparing the detection value and the respective estimation values for the assumed road surface conditions, the current road surface condition is determined. Further, a lateral acceleration is calculated based on a vehicle slip angle, and compared with the detection value for determination of the road surface condition, and also with a predetermined limit value for determination of a vehicle's limit running condition.

17 Claims, 30 Drawing Sheets

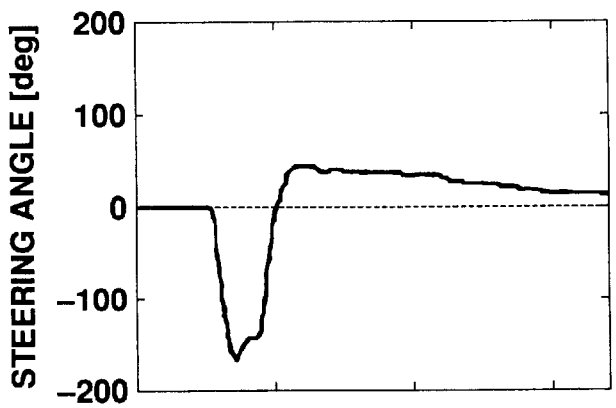
Fig. 7A
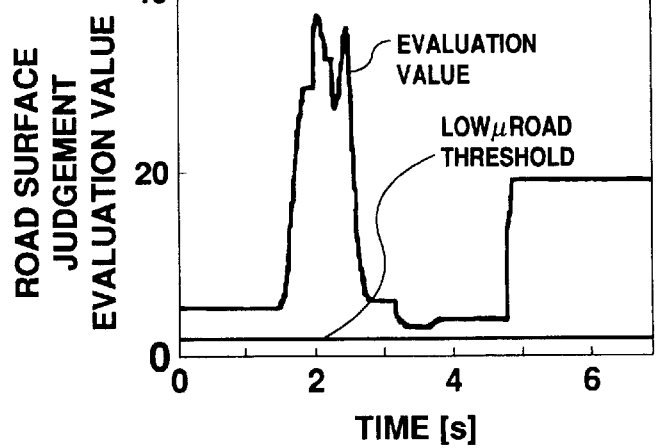
Fig. 7B
Fig. 7C
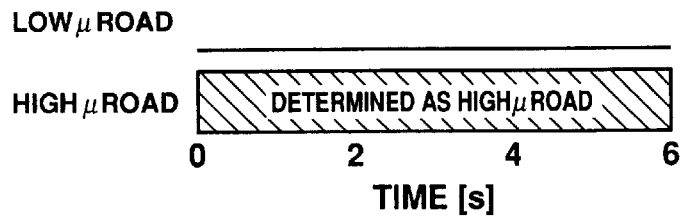
Fig. 7D

VEHICLE RUNNING CONDITION JUDGEMENT DEVICE

BACKGROUND OF THE INVENTION

1. Field of the Invention

The present invention relates to a vehicle running condition judgment device, and in particular to a device for judging a road surface condition and a vehicle under limit condition, using a vehicle motion model.

2. Description of the Related Art

A road surface condition judgment device is mounted on a vehicle, and judges a road surface condition while the vehicle is running. A judgment result on the road surface condition obtained on such a device is used in electronic running control. For enhanced driving safety, judgment with improved accuracy on road surface condition has been desired. In particular, for various driving control in a four-wheel steering system and a vehicle spin prevention system, accurate comprehension of road surface condition is critical.

Japanese Patent Laid-open No. Hei 8-119131 discloses a device for detecting a slippery state of a road surface. Based on values obtained from various sensors (sensor values) and pre-stored tire characteristics substituted into a vehicle motion model (an equation of state), the device estimates reference state quantity (e.g., a vehicle lateral acceleration). Then, a difference (a residual error) between the reference state quantity and detected state quantity based on a sensor value (e.g., a vehicle lateral acceleration) is calculated, and a predetermined number of such data items on the difference are ordered in time series to form reference difference time series data. Meanwhile, a plurality of estimated difference time series data items are prepared according to respective road surface conditions. Then, the pattern of the reference difference time series data is compared with those of the plurality of estimated difference time series data items to see which data item shows the closest pattern to that of the reference difference time series data for judgment on current road surface condition.

Japanese Patent Laid-open No. Hei 9-311042 discloses a device for estimating a vehicle slip angle using a vehicle motion model, similar to the above. In this device, a lateral acceleration estimated from a cornering performance model is compared with a detected lateral acceleration for judgment on the road surface condition, based on which tire characteristics are determined. The determined tire characteristics are in turn used in estimation of a vehicle slip angle. For estimation of a vehicle slip angle, a feed back control method utilizing an observer is employed, details of which are also disclosed in Japanese Patent Laid-open No. Hei 3-122541. In this method, a state estimation technique, one of the modern control theories, is utilized in detection of a vehicle slip angle.

A conventional device disclosed in the above mentioned Japanese Patent Laid-open No. Hei 8-119131, however, aims at detection of slippery state of a road surface only at the initial stage of a vehicle's turning before spinning, and can therefore be used, in principle, for judgment on road surface condition only at the initial stage of a vehicle's turning. After all, this device can not be used when the road surface condition varies while the vehicle is turning, and the road surface condition in such circumstances can therefore not be detected. Specifically, in the above conventional device, phase deviation is caused, as the vehicle begins slipping, between a modeling result and an actual value obtained on a sensor. As such, the reference difference time series data matches to none of the estimated difference time series data, resulting in failure of accurate judgment on road surface condition. In other words, judgment on road surface condition by the above conventional device is achievable only at the initial stage of a vehicle's turning.

Also, various conventional devices are incapable of correct determination on road surface condition when a vehicle runs under various running conditions. For example, there has conventionally been a problem that judgment on road surface condition is applicable only at the initial stage of a vehicle's turning.

SUMMARY OF THE INVENTION

The present invention has been conceived to overcome the above problems and aims to achieve accurate estimation of road surface conditions. Another object of the present invention is to achieve detection of a change in road surface condition, if such a change occurs during a vehicle's turning. A still further object of the present invention is to achieve prompt and reliable detection of a vehicle in a limit running condition.

In order to achieve the above objects, according to the present invention, there is provided a vehicle running condition judgment device, comprising detection means for detecting a state quantity concerning motion of a vehicle; memory means for storing non-linear tire characteristics for each of a plurality of assumed road surfaces; slip angle estimation means for estimating a vehicle slip angle for each of the plurality of assumed road surfaces based on the state quantity and the non-linear tire characteristics; feedback compensation means for compensating the vehicle slip angle for each of the plurality of assumed road surfaces by compensating a currently estimated vehicle slip angle for each of the plurality of assumed road surfaces based on a current state quantity and a last vehicle slip angle having been estimated for respective assumed road surfaces; and judgment means for judging current road surface condition based on the vehicle slip angle compensated by said feed-back compensation means.

Non-linear tire characteristics for respective assumed road surface conditions (e.g., a dry road and a snow covered road) are pre-stored for later use in estimation of a vehicle slip angle. Comparison between an estimation value (or other physical quantity calculated based on the estimation value) and an actual detection value will lead to determination on current road surface condition. Data on the estimated slip angle is compensated in the feed-back compensation means before being output. With this arrangement, a road surface condition can be accurately determined, avoiding phase deviation, even when the condition is changed while the vehicle is turning.

Further, according to one aspect of the present invention, non-linear tire characteristics show non-saturated characteristics. With non-saturated characteristics, an estimation value can be prevented from being oscillated.

According to another aspect of the present invention, the judgment means comprises estimation angular velocity calculation means for calculating a vehicle slip angular velocity for each of the plurality of assumed road surfaces as an estimation angular velocity based on the vehicle slip angle compensated by said feed-back compensation means for each of the plurality of assumed road surfaces, detection angular velocity calculation means for calculating a vehicle slip angular velocity as a detection angular velocity based on the state quantity, and road surface condition judgment means for judging a current road surface condition through comparison between the detection angular velocity and the estimation angular velocity.

With this arrangement, estimation angular velocities are obtained based on vehicle slip angles for the respective assumed road surfaces. The current road surface condition is determined depending on which of the estimated angular velocities is closest to the actual angular velocity.

Still further, according to another aspect of the present invention, the judgment means comprises estimation lateral acceleration calculation means for calculating a lateral acceleration for each of the plurality of assumed road surfaces as an estimation lateral acceleration based on the non-saturated tire characteristics and the vehicle slip angle compensated by said feed-back compensation means for each of the plurality of assumed road surfaces; and road surface condition judgment means for judging a current road surface condition through comparison between a detected lateral acceleration and the estimation lateral acceleration.

With this arrangement, lateral accelerations are estimated based on vehicle slip angles for the respective assumed road conditions to see which of the estimated lateral accelerations is closest to the actual lateral acceleration for determination on current road surface condition.

Yet further, according to another aspect of the present invention, the device further comprises limit condition judgment means for judging whether or not the vehicle is under a limit condition through comparison between a predetermined limit value and an estimation lateral acceleration corresponding to the current road surface condition judged by said road surface condition judgment means, the estimation lateral acceleration being selected from estimation lateral accelerations calculated by said estimation lateral acceleration calculation means for respective assumed road surfaces.

In actual fact, however, tires demonstrate saturated characteristics with a saturating cornering force as a steering angle becomes larger even before the vehicle reaches limit running condition, and an actual lateral acceleration (lateral G) reaches a limit value. In this sense, actual lateral G (lateral G detected on a sensor) is not suitable for use in prompt and accurate determination on a vehicle's limit running condition. Instead, a non-linear tire characteristic model is used in estimation of lateral G. As this model has non-saturated characteristics even when a vehicle is under a limit running condition, a lateral G value estimated using the model turns out to be very different from, particularly larger than, an actual lateral G when the vehicle is in the limit running condition. In this embodiment, this difference between the estimated and actual lateral G values caused when a vehicle is under the limit running condition is utilized to determine whether or not a vehicle has reached the limit running condition. Specifically, with an estimated lateral G value in excess of a predetermined limit value (which is determined depending on an actual lateral G limit value), the vehicle is determined to have reached the limit running condition. With this arrangement, it can be promptly detected that a vehicle has reached the limit running condition without observation for a predetermined amount of time.

According to another aspect of the present invention, there is provided a vehicle running condition detection device comprising detection means for detecting a state quantity concerning motion of a vehicle; memory means for storing non-linear tire characteristics for each of a plurality of assumed road surfaces; slip angle estimation means for estimating a vehicle slip angle for each of the plurality of assumed road surfaces based on the state quantity and the non-linear tire characteristics; feedback compensation means for compensating the vehicle slip angle for each of the plurality of assumed road surfaces by compensating a currently estimated vehicle slip angle for each of the plurality of assumed road surfaces based on a current state quantity and a last vehicle slip angle having been estimated for the respective assumed road surfaces, lateral acceleration estimation means for estimating a lateral acceleration for each of the plurality of assumed road surfaces based on the non-linear tire characteristics and the vehicle slip angle compensated by said feedback compensation means; and limit condition judgment means for judging whether or not the vehicle is under a limit condition through comparison between a predetermined limit value and a lateral acceleration corresponding to an actual road surface condition, the lateral acceleration being selected from lateral accelerations estimated by said lateral acceleration estimation means for respective assumed road surfaces.

In actual fact, the road surface condition can be judged using any of various methods. Once actual road surface condition has been determined, an estimation lateral G, corresponding to the actual road surface condition, is determined accordingly. When the determined estimation lateral G is in excess of a predetermined limit value, the vehicle is determined as being under the limit condition. The non-linear tire characteristics preferably have non-saturated characteristics.

According to still another aspect of the present invention, there is provided a vehicle running condition detection device, comprising detection means for detecting a state quantity concerning motion of a vehicle; memory means for storing non-linear tire characteristics for each of a plurality of assumed road surfaces; calculation means for estimating a quantity concerning a vehicle running condition for each of the plurality of assumed road surfaces based on the state quantity and the non-linear tire characteristics; and limit condition judgment means for judging whether or not the vehicle is under a limit condition through comparison between a predetermined limit value and the quantity estimated by said calculation means corresponding to an actual road surface condition, the quantity being selected from quantities estimated by said calculation means for the respective assumed road surfaces.

In this aspect of the present invention, the quantity which concerns vehicle running condition is a physical quantity required to be observed in controlling for stabilized posture of a vehicle in motion, and preferably a lateral acceleration. When the quantity which concerns running condition is in excess of a predetermined limit value, the vehicle is determined as being under limit condition. With this arrangement, the posture of a vehicle in motion can be reliably stabilized. The non-linear tire characteristics preferably have non-saturated characteristics.

BRIEF DESCRIPTION OF THE DRAWINGS

The above and the other objects, features, and advantages of the present invention, will become further apparent from the following description of the preferred embodiment taken in conjunction with the accompanying drawings wherein:

FIG. 7A is a graph showing changes with time of a steering angle when the vehicle changes lanes (Case 2) on a high μ road;

FIG. 7B is a graph showing changes with time of a yaw rate and lateral G when the vehicle changes lanes (Case 2) on a high μ road;

FIG. 7C is a graph showing changes with time of a road surface evaluation value when the vehicle changes lanes (Case 2) on a high μ road;

FIG. 7D is a graph showing changes with time of judgment results when the vehicle changes lanes (Case 2) on a high μ road;

DESCRIPTION OF THE PREFERRED EMBODIMENTS

Preferred embodiments of the present invention will be described with reference to the accompanying drawings.

Figure 1:
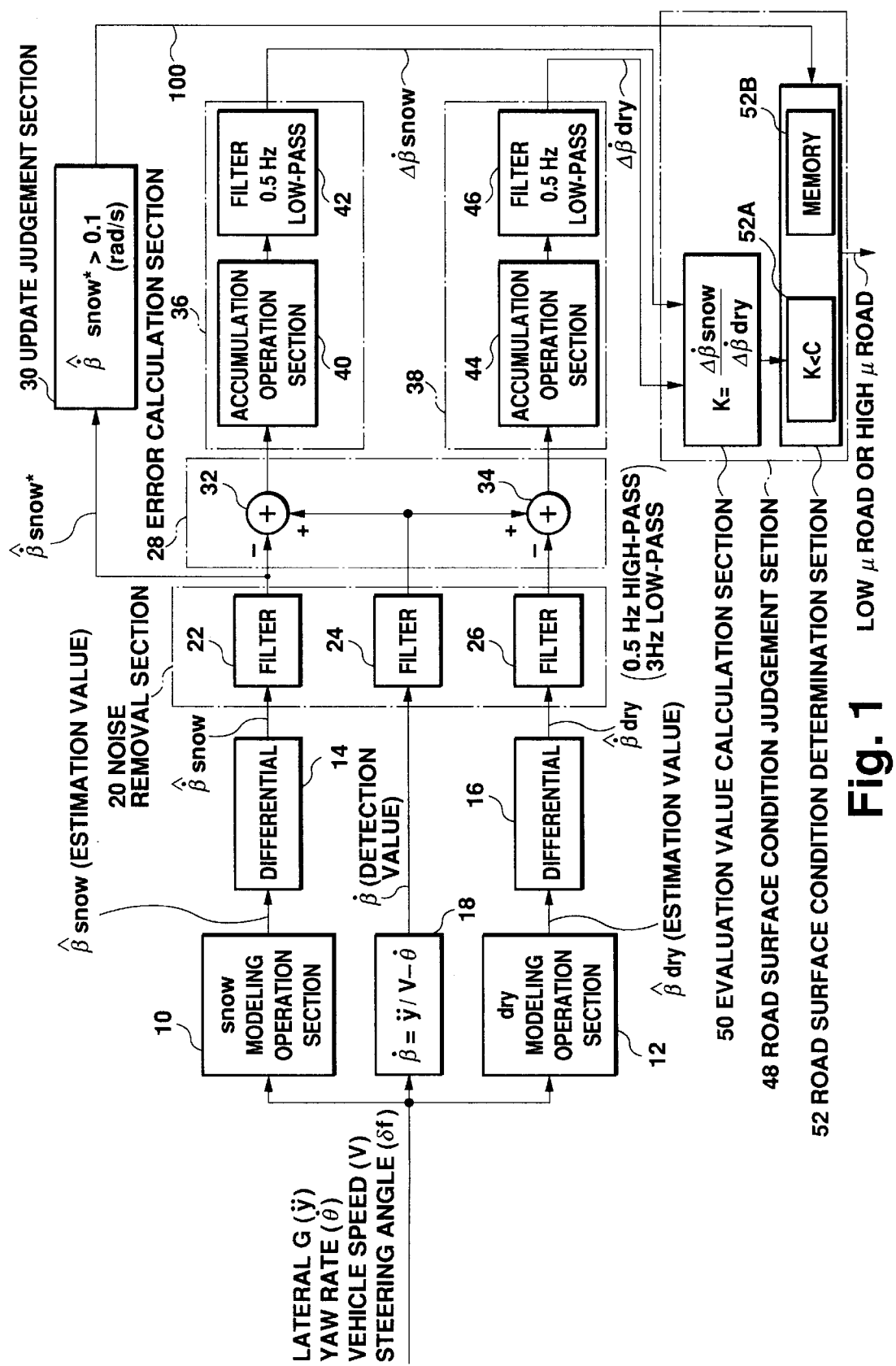
FIG. 1 is a block diagram showing a structure of a preferred embodiment of the present invention.

FIG. 1 is a block diagram showing a complete structure of a device of a preferred embodiment of the present invention. The device of the present invention may be mounted on, for example, a vehicle such as an automobile for automatic minute by minute judgment on condition of a road surface where the vehicle is running. The respective components shown in FIG. 1 can be achieved by means of either software or hardware or a combination thereof.

Modeling operation sections 10, 12 are means for estimating a state quantity concerning running of a vehicle ("a vehicle slip angle" in this embodiment), using a non-linear vehicle model. The modeling operation sections 10, 12 receive a signal from various sensors mounted on the vehicle, specifically, signals indicative of state quantities such as a lateral acceleration (lateral G), a yaw rate, a vehicle speed, and a steering angle. A lateral acceleration (lateral G), a yaw rate, a vehicle speed, and a steering angle are denoted throughout this specification as y(), θ(), v, δf respectively, in which () means time differential and () means two-order time differential. These signals for state quantities are also supplied to an operation section 18 (described later).

Figure 2:
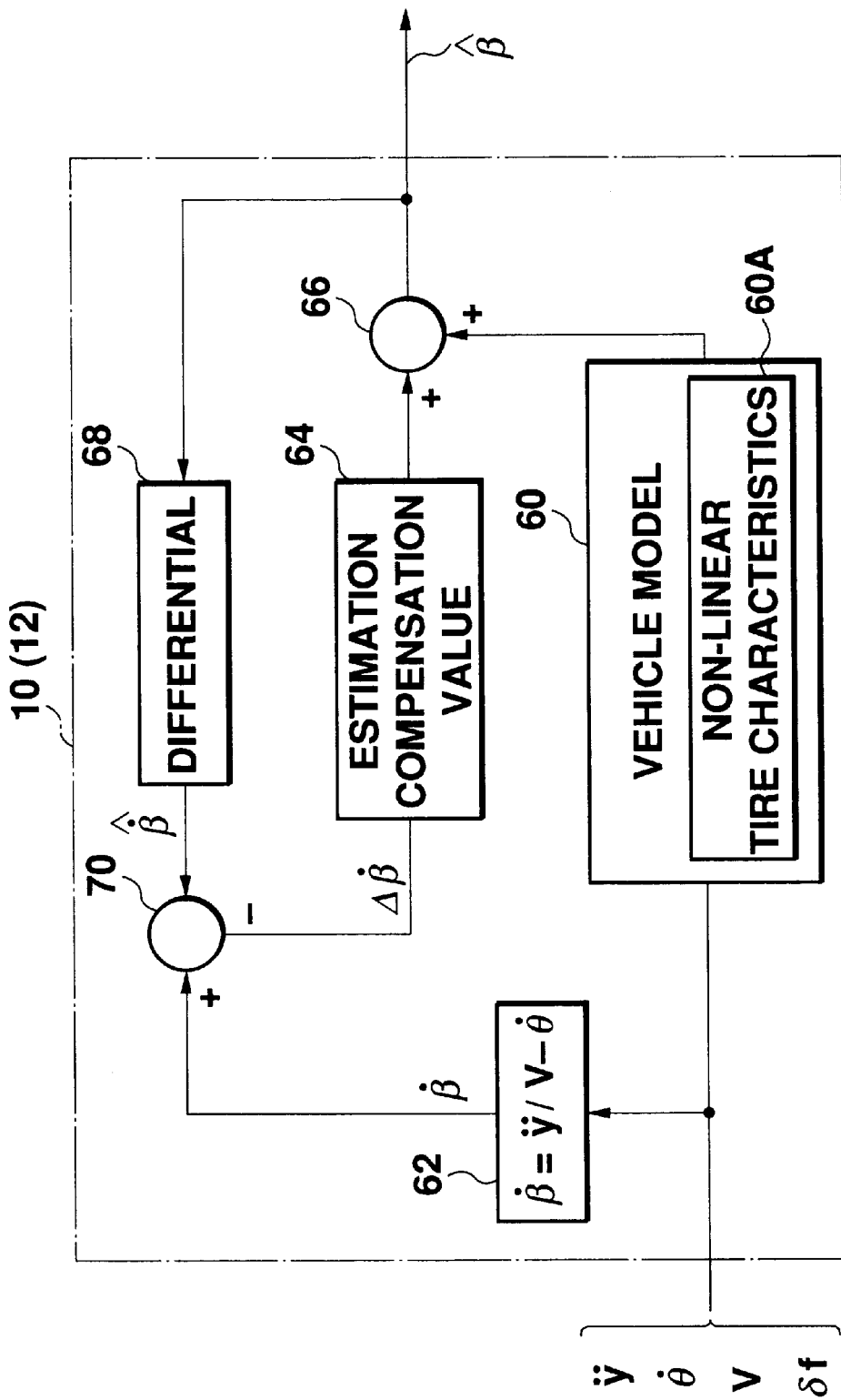
FIG. 2 is a block diagram showing a structure of a modeling operation section shown in FIG. 1.

FIG. 2 shows an example of a specific structure of the modeling operation sections 10, 12 shown in FIG. 1. A snow modeling operation section 10 and a dry modeling operation section 12 have the same structure, and may be formed as either separate or integrated entities.

Figure 3:
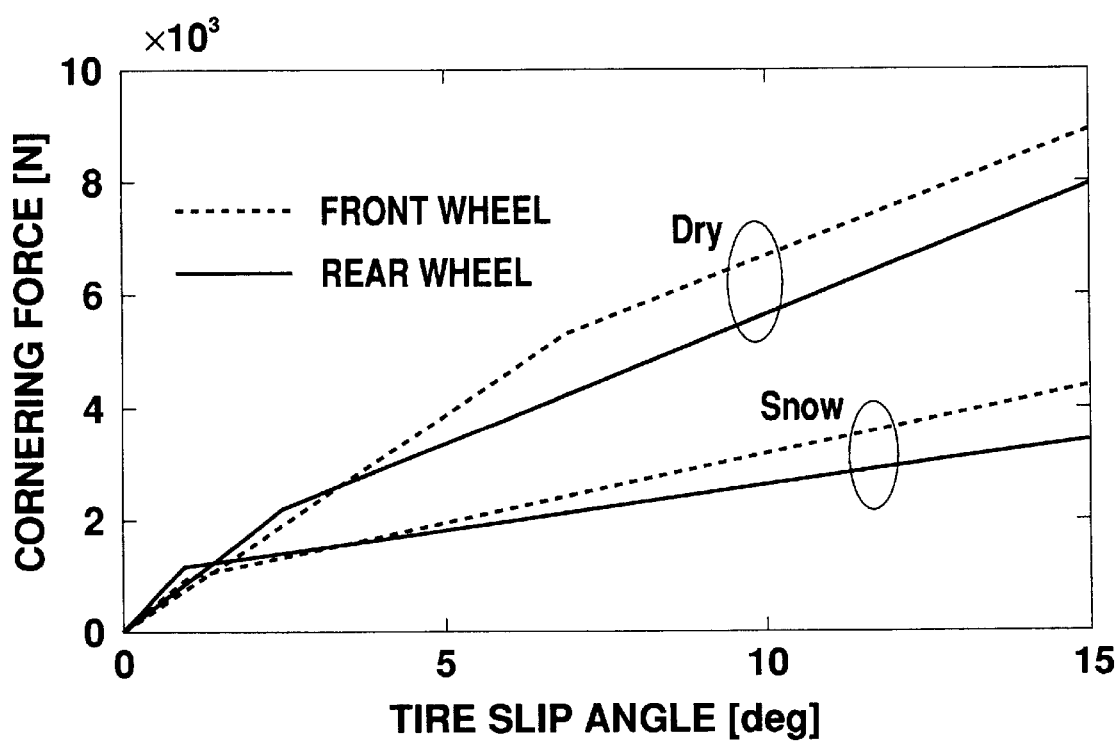
FIG. 3 is a graph showing tire characteristics.

An operation section 60, having an state equation for use as a non-linear vehicle model in this embodiment, is a means for estimating a vehicle slip angle based on various state quantities and tire characteristics substituted into the state equation. The operation section 60 has a memory 60A pre-loaded with data on non-linear tire characteristics as shown in FIG. 3. The snow modeling operation section 10 has data on non-linear tire characteristics for "snow" stored in its memory 60A, while the dry modeling operation section 12 has data on non-linear tire characteristics for "dry" stored in its memory 60A.

As the structures of the modeling operations sections 10 and 12 differ solely in the characteristics of tires in use, as is obvious in comparison, the sections 10 and 12 are preferably formed as a substantially single modeling operation section. This theory may be applied to other reduplicate components shown in FIGS. 1 and 2.

Referring to FIG. 2, respective components around the operation section 60 (operation sections 62 and 64, an addition operation section 66, a differential operation section 68, and a difference operation section 70) together constitute a feedback compensation means for compensating a vehicle slip angle estimated as above. Specifically, the operation section 62 calculates a vehicle slip angular velocity based on a current state quantity, while the differential operation section 68 calculates a vehicle slip angular velocity based on the current and last estimated vehicle slip angles (more specifically, a vehicle slip angle after compensation to be described later). The difference operation section 70 calculates a difference (a residual error) between the vehicle slip angular velocity calculated by the operation section 62 and the vehicle slip angular velocity, corresponding to the last estimated vehicle slip angle, calculated by the differential operation section 68. Based on the calculated difference, the operation section 64 calculates a compensation value (an estimation compensation value), and the calculated compensation value is then added in the addition operation section 66 to the vehicle slip angle output from the operation section 60. The compensated vehicle slip angle is output to the differential operation section 68 as well as to the outside of the modeling operation section. Note that the operation section 64 may be realized with, for example, a function or a table for determining a compensation value.

The above-mentioned feedback compensation enables estimation following a change, if a change occurs while the vehicle is turning, in road surface condition, solving the conventional problem of phase deviation.

Referring again to FIG. 1, a vehicle slip angle (an estimation value) estimated by the snow modeling operation section 10 is denoted as β(^)snow, wherein (^) means an estimation value.

The differential operation section 14 carries out differential operation with respect to the estimated vehicle slip angle to obtain a vehicle slip angular velocity β(^)()snow, which is a time differential of β(^).

As described above, an estimation value of a vehicle slip angular velocity (an estimation angular velocity) corresponding to road surface condition "snow" can be obtained using the snow modeling operation section 10 and the differential operation section 14.

Meanwhile, a vehicle slip angle (an estimation value) β(^) dry is estimated in the dry modeling operation section 12, and then entered into the differential operation section 16, where differential operation is carried out with respect to the entered vehicle slip angle to obtain a vehicle slip angular velocity β(^)() dry.

In summary, vehicle slip angular velocities corresponding to road surface conditions "snow" and "dry" are calculated in the snow modeling operation section 10 followed by the differential operation section 14, and in the dry modeling operation section 12 followed by the differential operation section 16, respectively.

Besides the above, the operation section 18 calculates a detection value of a vehicle slip angular velocity, or β(), based on informed lateral acceleration, a yaw rate, and a vehicle speed by a sensor.

Specifically, the following expression is executed, which is substantially the same as that to be executed in the operation section 62 in FIG. 2.

$$\dot{\beta} = \dot{\psi}/V - \dot{\theta} \qquad (1)$$

As described above, a detection value of a vehicle slip angular velocity is specified as an output from the operation section 18, and estimation values of vehicle slip angular velocities for respective assumed road surface conditions are estimated as described above.

Note that the operation section 18 in FIG. 1 and the operation section 62 in FIG. 2 may be formed into a single entity as they carry out substantially the same calculation. This theory is also the case with the differential operation sections 14 and 16 in FIG. 1 and the differential operation section 68 in FIG. 2.

A noise removal section 20 is means for filtering the above described detection value and two estimation values, and comprises three filters 22, 24 and 26 corresponding to the respective values. These filters 22, 24 and 26 are provided for removing or alleviating any error factors, such as road surface external disturbance which may occur on a bank or a cant, and sensor noise. Each filter functions as both a 0.5 Hz high-pass filter and a 3 Hz low-pass filter, i.e., as a band-pass filter. The filters may be given desired characteristics depending on each use. All three filters 22, 24, and 26 are not always necessary, and one may combine the functions of two or more of these filters.

The two estimation values and the detection value are supplied, after being filtered in the noise removal section 20, to an error calculation section 28. The estimation value, in particular, of a vehicle slip angular velocity for "snow" of the two estimation values is also supplied to an update judgment section 30 in this embodiment. A vehicle slip angular velocity output from the filter 22 is denoted as β(^)()snow*.

The update judgment section 30 is means for determining whether or not to update a previous judgment result when making judgment on road surface condition in every sampling cycle (described later). In this embodiment, this updating decision is made based particularly on a vehicle slip angular velocity for "snow", and specifically, through determination as to whether or not the following judgment expression is met.

$$\dot{\hat{\beta}} \text{ snow*} > 0.1 \text{ (rad/s)} \qquad (2)$$

Therefore, an output from the update judgment section 30, or an update judgment result signal 100, indicates whether or not the above expression (2) is met, and this information is used later in a road surface condition judgment section 48 (described later).

Here, the error calculation section 28, provided downstream of the noise removal section 20, specifically comprises two deviation calculation devices 32 and 34, each constantly calculating an error in an estimation value relative to a corresponding detection value. Specifically, the deviation calculation device 32 calculates an error for "snow" condition, while the deviation calculation device 34 calculates an error for "dry" condition. It should be noted that in the case that a state quantity at a certain time is supplied in parallel to the modeling operation sections 10, 12 and the operation section 18 for calculation of estimation and detection values, the calculated estimation and detection values, which concern the state quantity at the same time, are controlled to be supplied simultaneously to the error calculation section 28.

The above mentioned error describes reliability of an estimation value obtained through modeling. In other words, the error describes grade of adaptiveness of a premise condition (an assumed road surface condition) used in modeling. That is, by comparing which tire characteristics are most suited to the present condition, current road surface condition can resultantly be known.

Provided downstream of the error calculation section 28 are operation sections 36 and 38, which comprise accumulation operation sections 40 and 44 and filters 42 and 46, respectively. The accumulation operation sections 40 and 44 square the error from the deviation calculation devices 32 and 34, respectively, and accumulate a predetermined number (ten here) of such squared values to obtain an accumulation value. That is, ten errors are accumulated in every sampling cycle in the accumulation operation sections 40 and 44, and the accumulation value of the ten errors is supplied to the filters 42 and 46, respectively.

The filters 42 and 46, each comprising a 0.5 Hz low-pass filter in this embodiment, smooth an accumulation value.

With operation in the operation sections 36 and 38, a statistical or smoothed error amount based on a plurality of errors can be obtained for use in judgment on road surface condition. Note that an absolute operation may be applied in place of the above mentioned square operation. A desired number of errors may be accumulated in light of judgment accuracy or responsibility. The accumulation operation sections 40 and 44 each have a memory for storing a predetermined number of error information items, the capacity thereof being desirably determined according to the number of error information items to be stored.

An error amount output from the operation section 36 is denoted as $\Delta\beta()$snow, and that from the operation section 38 is denoted as $\Delta\beta()$dry.

The road surface condition judgment section 48 comprises an evaluation value calculation section 50 and a road surface condition determination section 52 in this embodiment. The evaluation value calculation section 50 is means for calculating an evaluation value K for use in judgment on road surface condition, and specifically carries out the following calculation.

$$K = \frac{\Delta\beta \text{snow}}{\Delta\beta \text{dry}} \quad (3)$$

When the current road surface condition is a high $\mu$ road, an error amount for "snow" condition is significantly large compared to that for "dry" condition, as will be described later. That is, comparison of error amounts will lead to accurate determination of current road surface condition. For this purpose, the ratio between the two error amounts is obtained using expression (3), as described above.

The road surface condition determination section 52 has a comparator 52A and a memory 52B. The comparator 52A compares an evaluation value K and a predetermined threshold value C. The memory 52B stores the result of the last determination on road surface condition. When the comparison in the comparator 52A proves a smaller evaluation value K than a threshold value C, the road surface condition determination section 52 determines the road to be a low $\mu$ road, and when the comparison proves an evaluation value K equal to or larger than a threshold value C, the determination section 52 determines the road to be a high $\mu$ road.

It should be noted in this embodiment that the result on road surface condition is updated only when instructed so via the update judgment result signal 100, and the result of the last determination is kept as it is otherwise. This arrangement is employed to prevent erroneous judgment on road surface condition which may very likely be caused with a vehicle in relatively slow motion.

Here, instead of using one threshold in the structure of FIG. 1, two or more thresholds may be used for determination on current road surface condition. Also, instead of using an evaluation value K in the above, any judgment method can be applied as long as it uses an error corresponding to each assumed road surface condition as judgment criterion. In the case of a vehicle in relatively slow motion, where erroneous judgment is likely to be caused, the result of the last judgment may preferably be maintained.

FIG. 3 shows an example of non-linear tire characteristics, information being held in the modeling operation sections 10 and 12, wherein the lateral axis corresponds to a slip angle of a tire, and the vertical axis corresponds to a cornering force. As shown, the increase rate of the line representing characteristics for "snow" condition starts to decrease even in a region with a smaller slip angle, compared to those for "dry" condition. Due to such difference in the characteristics, a significant difference will be caused between estimation values for "dry" and "snow" conditions with the actual road surface condition being "dry", as described above. Utilizing this phenomenon, road surface condition can be judged, a specific example thereof being described below.

Figure 4A:
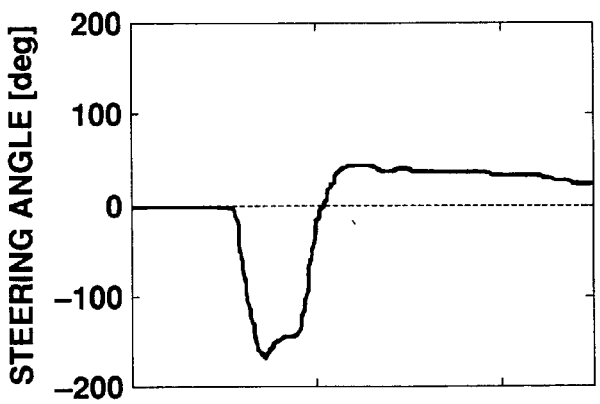
FIG. 4A is a graph showing changes with time of a steering angle on a high $\mu$ road.
Figure 4B:
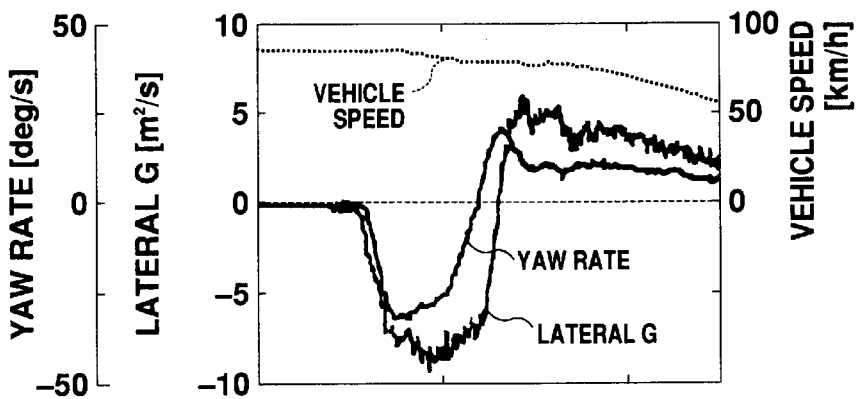
FIG. 4B is a graph showing changes with time of a yaw rate and lateral G on a high $\mu$ road.
Figure 4C:
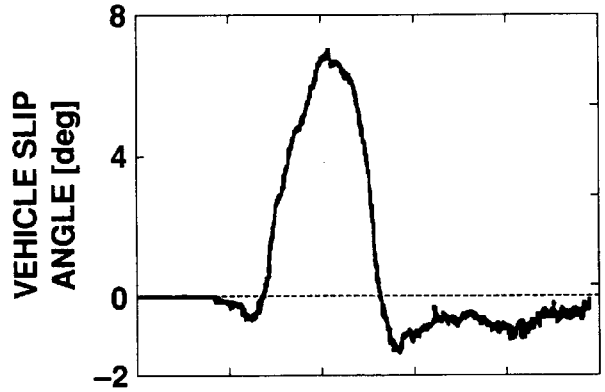
FIG. 4C is a graph showing changes with time of a vehicle slip angle on high μ road.
Figure 4D:
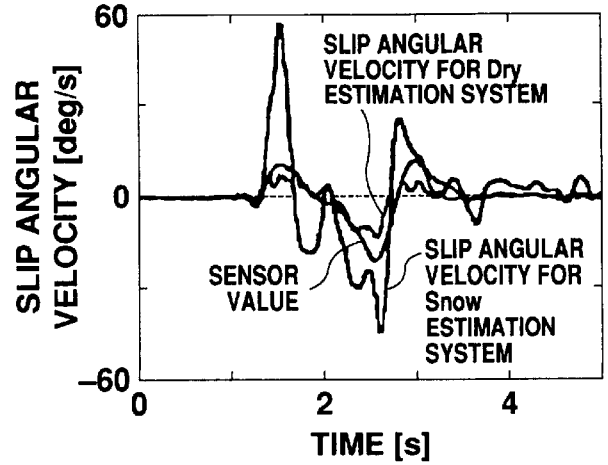
FIG. 4D is a graph showing changes with time of a slip angular velocity on a high μ road.
Figure 5A:
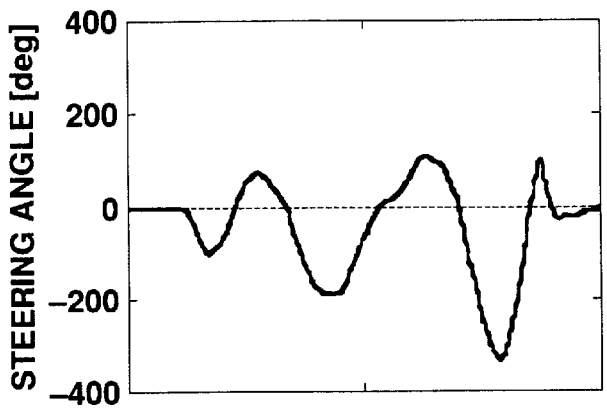
FIG. 5A is a graph showing changes with time of a steering angle on a low μ road.
Figure 5B:
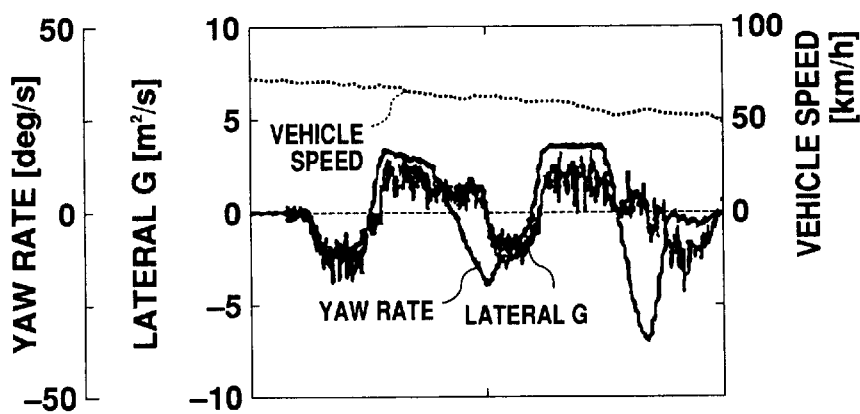
FIG. 5B is a graph showing changes with time of a yaw rate and lateral G on a low μ road.
Figure 5C:
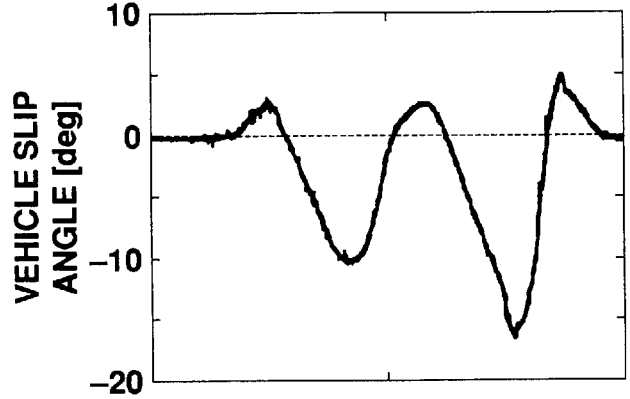
FIG. 5C is a graph showing changes with time of a vehicle slip angle on a low μ road.
Figure 5D:
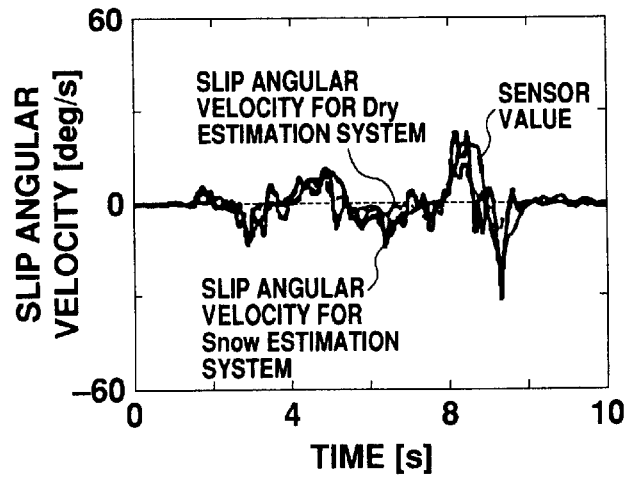
FIG. 5D is a graph showing changes of a slip angular velocity on a low μ road.

FIGS. 4A to 4D and FIGS. 5A to 5D respectively show relationships between various state quantities and vehicle slip angular velocities, FIGS. 4A to 4D concerning a high $\mu$ road, FIGS. 5A to 5D concerning a low $\mu$ road. FIGS. 4A and 5A show a change of a steering angle. FIGS. 4B and 5B show changes of a yaw rate, a lateral acceleration, and a vehicle speed. FIGS. 4C and 5C show a change of a vehicle slip angle. FIGS. 4D and 5D show relationships between a detection value (a sensor value) and respective estimation values (slip angular velocities for a dry estimation system and for a snow estimation system).

As is obvious from the drawings in comparison, a significant error is observed between a sensor value and an estimation value for "snow" with a high $\mu$ road. That is, whereas estimation and detection values are substantially the same as each other, and errors for "dry" and "snow" conditions differ only slightly with a low $\mu$ road, a significant difference is observed between such errors with a high $\mu$ road. The present invention utilizes this phenomenon to make judgment on current road surface condition.

FIGS. 6A through 9D show judgment results on road surface condition, FIGS. 6A through 7D showing those with a vehicle changing lanes on a high μ road, FIGS. 8A through 9D showing those with a vehicle slaloming on a low μ road. FIGS. 6A through 6D and 7A through 7D concern cases 1 and 2, respectively, while FIGS. 8A through 8D and 9A through 9D concern cases 1 and 2, respectively.

FIGS. 6A, 7A, 8A, and 9A show a change of a steering angle. FIGS. 6B, 7B, 8B, and 9B show changes of a yaw rate, a lateral acceleration, and a vehicle speed. FIGS. 6C, 7C, 8C, and 9C show a change of an evaluation value. FIGS. 6D, 7D, 8D, and 9D show a judgment result.

Figure 6A:
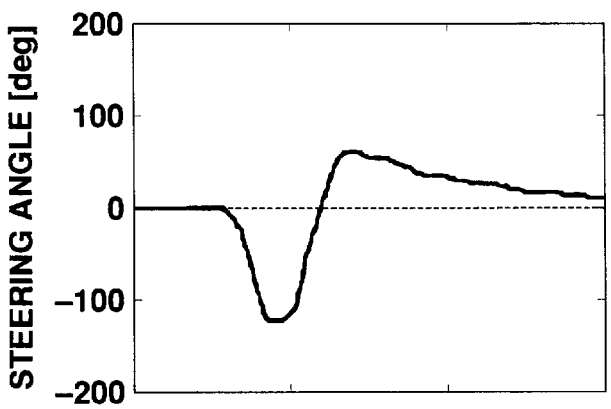
FIG. 6A is a graph showing changes with time of a steering angle when the vehicle changes lanes (Case 1) on a high μ road.
Figure 6B:
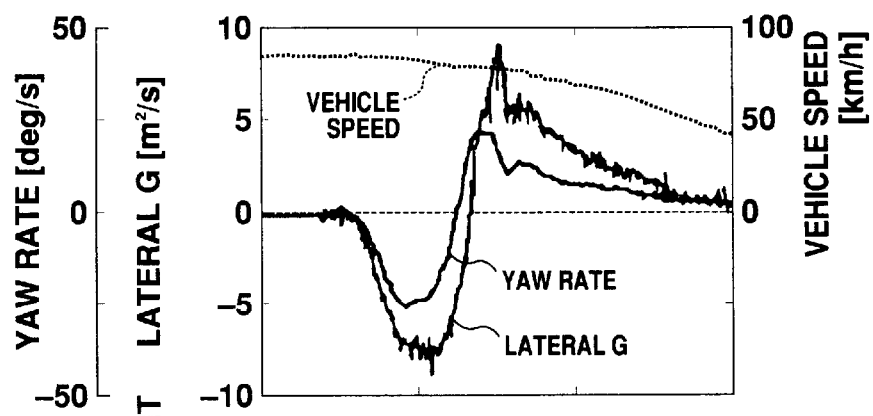
FIG. 6B is a graph showing changes with time of a yaw rate and lateral G when the vehicle changes lanes (Case 1) on a high μ road.
Figure 6C:
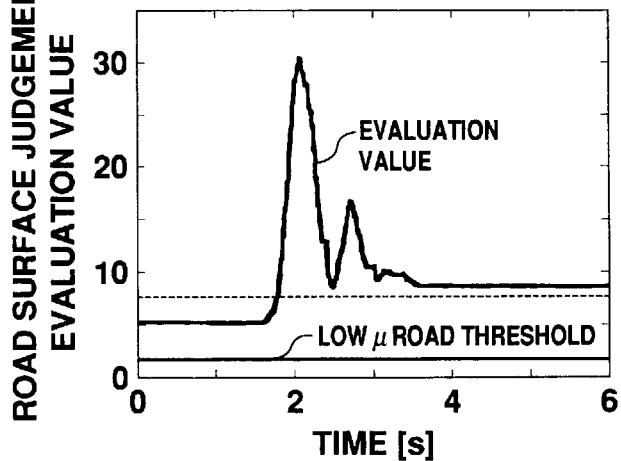
FIG. 6C is a graph showing changes with time of a road surface evaluation value when the vehicle changes lanes (Case 1) on a high μ road.
Figure 6D:
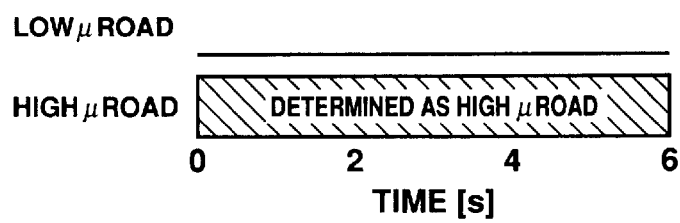
FIG. 6D is a graph showing changes with time of judgment results when the vehicle changes lanes (Case 1) on a high μ road.

Referring to FIGS. 6A through 7D, when a steering angle is changed as shown in FIGS. 6A and 7A (lane change), a yaw rate, a lateral acceleration, and a vehicle speed are accordingly changed significantly. With the premise of such changes, an evaluation value is obtained, as shown in FIGS. 6C and 7C, using a structure shown in FIG. 1. Using the obtained evaluation value, judgment is made on road surface condition as shown in FIGS. 6D and 7D. In the cases 1 and 2 shown in FIGS. 6A through 6D and 7A through 7D, respectively, judgment is made as a high μ road.

Figure 8A:
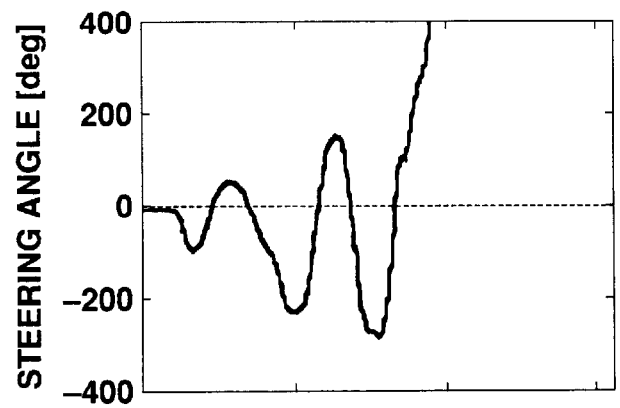
FIG. 8A is a graph showing changes with time of a steering angle when the vehicle changes lanes (Case 1) on a low μ road.
Figure 8B:
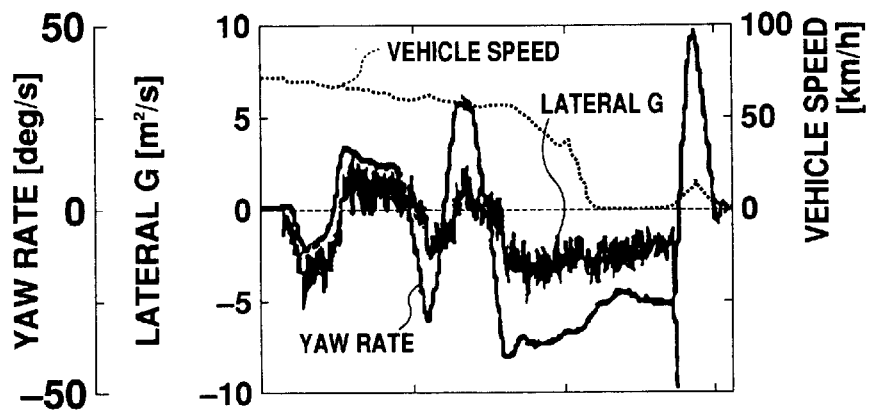
FIG. 8B is a graph showing changes with time of a yaw rate and lateral G when the vehicle changes lanes (Case 1) on a low μ road.
Figure 8C:
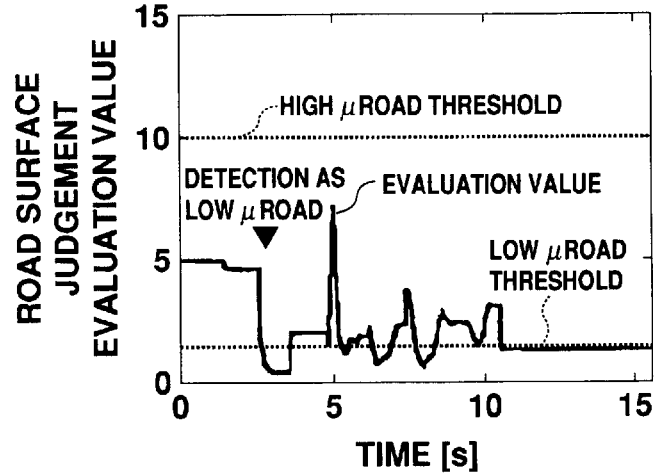
FIG. 8C is a graph showing changes with time of a road surface evaluation value when the vehicle changes lanes (Case 1) on a low μ road.
Figure 8D:
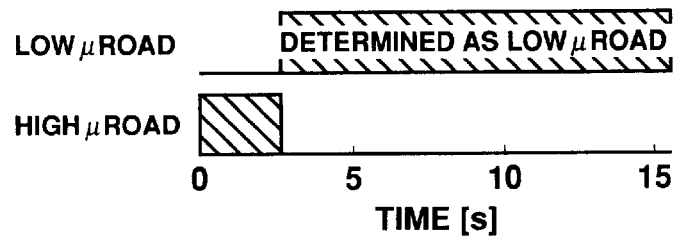
FIG. 8D is a graph showing changes with time of judgment results when the vehicle changes lanes (Case 1) on a low μ road.
Figure 9A:
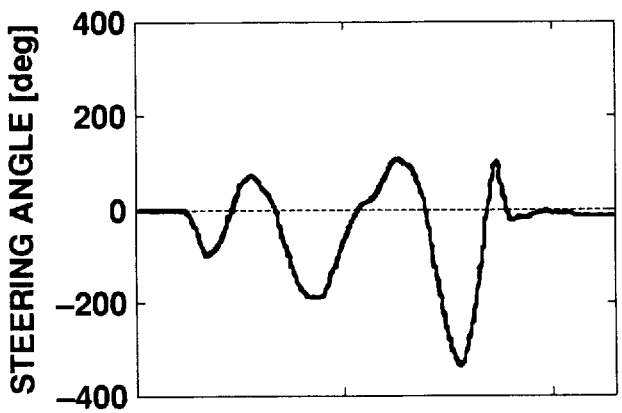
FIG. 9A is a graph showing changes with time of a steering angle when the vehicle changes lanes (Case 2) on a low μ road.
Figure 9B:
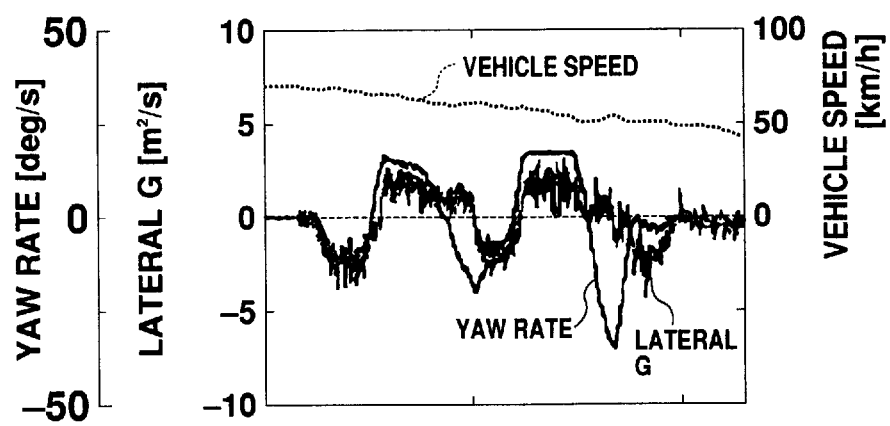
FIG. 9B is a graph showing changes with time of a yaw rate and lateral G when the vehicle changes lanes (Case 2) on a low μ road.

Meanwhile, referring to FIGS. 8A through 9D, when a vehicle slaloms on a low μ road, a steering angle is changed as shown in FIGS. 8A and 9A. Accordingly, various state quantities are also changed, causing an evaluation value to vary as shown in FIGS. 8C and 9C. In such a case, determination is initially made such that the vehicle runs on a high μ road, and at a point where the evaluation value dives below a threshold for a low μ road, the initial determination is changed to that the vehicle runs on a low μ road.

As described above, this embodiment can offer an advantage of accurate determination of a current road surface condition following a change in road surface condition. Effective use of the judgment results on road surface condition could enable various control for improved driving safety.

Figure 9C:
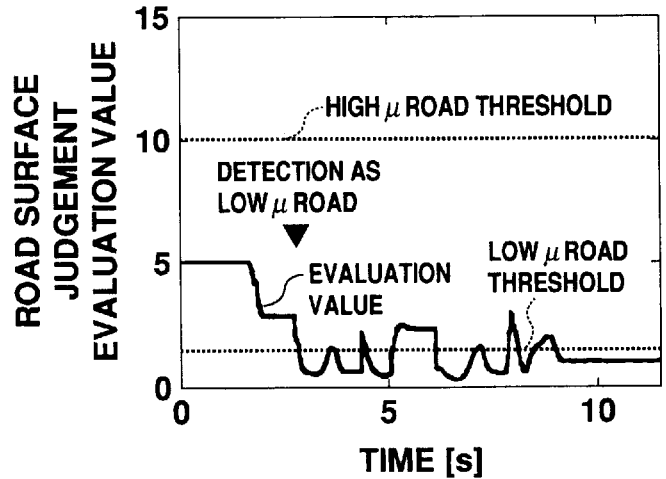
FIG. 9C is a graph showing changes with time of a road surface evaluation value when the vehicle changes lanes (Case 2) on a low μ road.
Figure 9D:
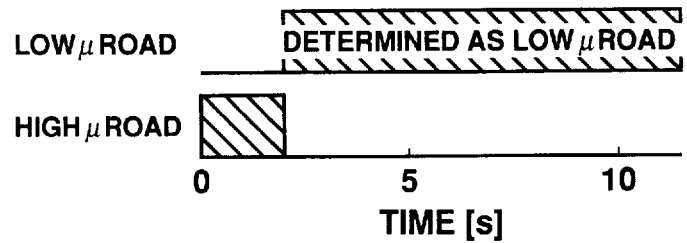
FIG. 9D is a graph showing changes with time of judgment results when the vehicle changes lanes (Case 2) on a low μ road.

Here, instead of using the two thresholds in the examples shown in FIGS. 8A through 9D, namely ones for low and high μ roads, as shown in FIGS. 8C and 9C, only one threshold may be used together with update judgment when judging on road surface condition. Alternatively, three or more thresholds may be used instead for more precise judgment. In such a case, preferably, the number of types of tire characteristics are required corresponding to that of assumed road surface conditions for judgment. Adaptiveness of the respective road surface conditions may be expressed based on a difference between a threshold and an evaluation value.

Figure 10:
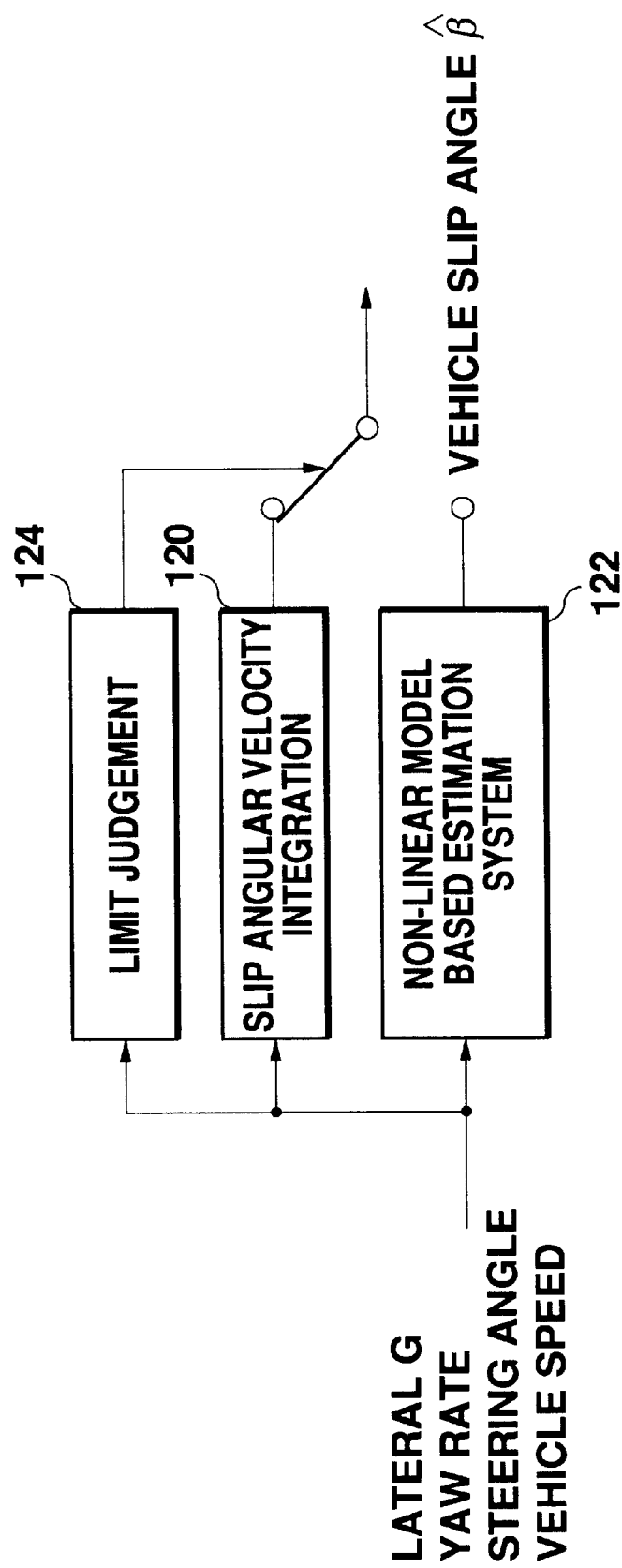
FIG. 10 is a block diagram showing a structure according to another preferred embodiment of the present invention.

FIG. 10 shows a basic structure of a system with application of a vehicle running condition judgment device according to another aspect of the present invention. An integration system 120 and an estimation system 122 are available as components for calculating a vehicle slip angle estimation value β(^) for input into a stabilizing system such as a vehicle stability control system. The integration system 120 estimates a vehicle slip angle through integration of a slip angular velocity based on lateral G, a yaw rate, and vehicle speed data obtained using a sensor. The estimation system 122, on the other hand, estimates a vehicle slip angle using a non-linear model based on lateral G (lateral acceleration), a yaw rate, a steering angle, and vehicle speed data obtained using a sensor. In the estimation, the estimation system 122, capable of highly accurate calculation, is initially used until the vehicle reaches a limit condition, and thereafter, where a non-linear model is no longer applicable, the integration system 120, whose output contains an integration error, is then used. Switching from the estimation system 122 to the integration system 120 is achieved using a limit judgment device 124 of this embodiment. Note that the non-linear model based estimation system 122 will also be described below.

Figure 11:
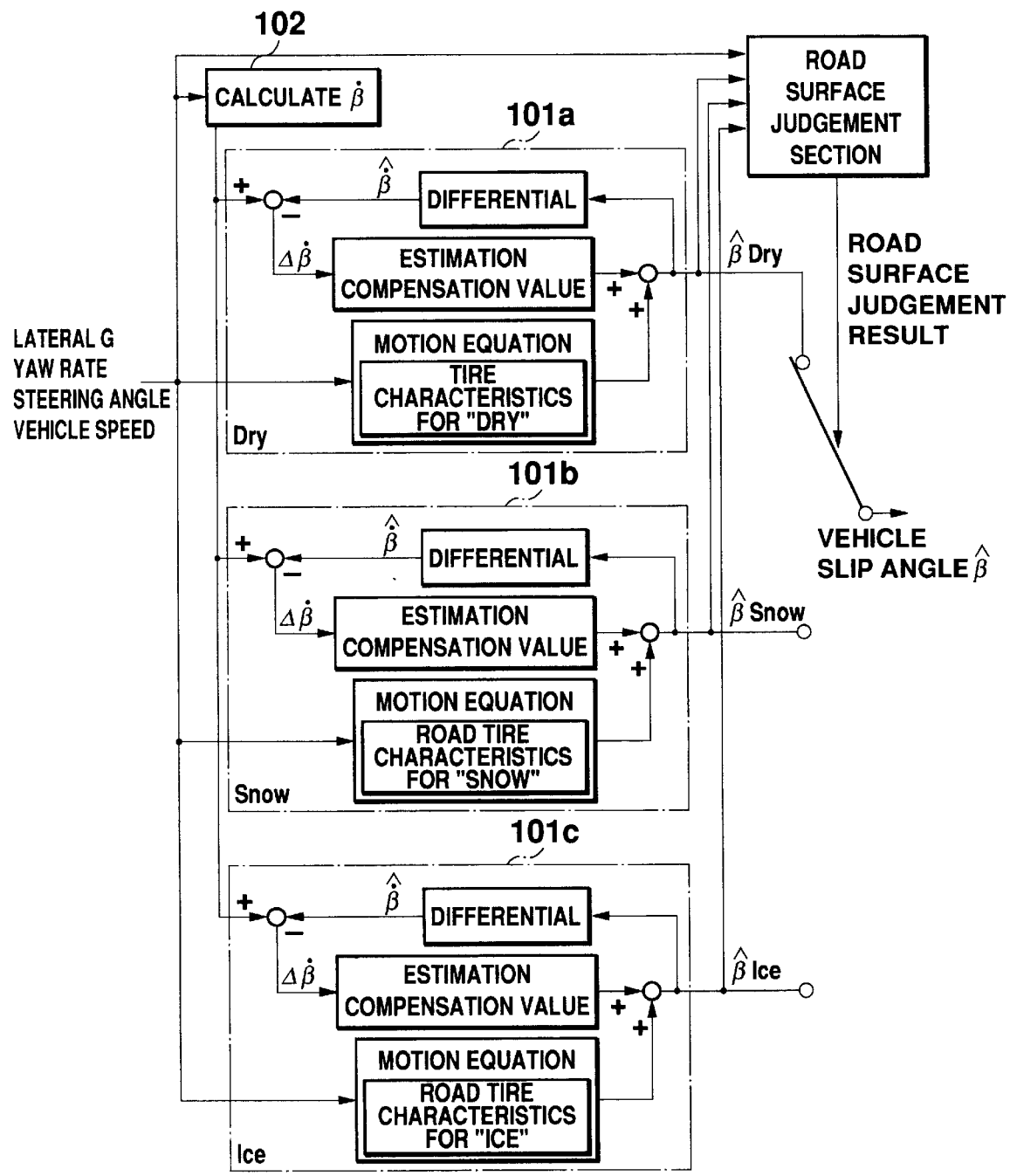
FIG. 11 is a block diagram showing a structure of an estimation system based on a non-linear model shown in FIG. 10.

FIG. 11 is a block diagram showing a structure of a non-linear model based estimation system 122, which operates on the same basic operation principle as that applied to the vehicle slip angle detection device disclosed in Japanese laid-open No. Hei 9-311042. Lateral G, a yaw rate, a steering angle, and a vehicle speed data obtained using a sensor are informed to a slip angle estimation section (for "dry") 101a, a slip angle estimation section (for "snow") 101b, and a slip angle estimation section (for "ice") 101c. The respective slip angle estimation sections 101a through 101c estimate slip angles, using a motion equation with substitution thereinto of tire characteristics for dry, snow covered, and icy roads (a non-linear tire characteristic model), and add a compensation value Δβ to the estimated slip angles to output slip angle estimation values β(^)Dry, β(^)Snow, and β(^)Ice, respectively.

Specifically, the slip angle estimation section for "dry" 101a obtains a slip angle as follows, using an expression for vehicle motion in the lateral direction.

$$\hat{\beta}' = -\frac{m\ddot{y} + (Cf \cdot Lf - Cr \cdot Lr)\dot{\theta}/V - Cf\delta f}{Cf + Cr} \quad (4)$$

In order to eliminate an error due to moving load resulting from a rolling vehicle or a modeling error of tire characteristics, the value obtained using expression (4) is given a compensation value Δβ. A compensation value Δβ is obtained in an estimation compensation value calculation section using expression (5), based on a difference Δβ()(^) between β() supplied from the slip angular velocity calculation section 102 and a time differential β()(^) of a fed-back slip angle estimation value.

$$\Delta\beta = -K \cdot m \cdot \Delta\beta/(Cf+Cr) \quad (5)$$

wherein K represents a feedback gain.

An ultimate slip angle estimation value β(^)Dry for a dry road can be obtained by adding a compensation value Δβ to the value β'(^), obtained using the motion equation (4), as described above. In expression (4), Cf is a front wheel cornering power, Cr is a rear wheel cornering power, m is a vehicle mass, y() is lateral G, Lf is a distance between a front axis and a center of gravity, Lr is a distance between a rear axis and a center of gravity, θ() is a yaw rate, V is a vehicle speed, and δf is a steering angle. β(), for example, means a time differential of β, and β()(^) means a time differential estimation value of β.

The respective slip angle estimation sections 101a through 101c output estimation values β(^)Dry, β(^)Snow, and β(^)Ice for selective output based on a judgment result on road surface condition, obtained in a road surface judgment section (described later).

Figure 12A:
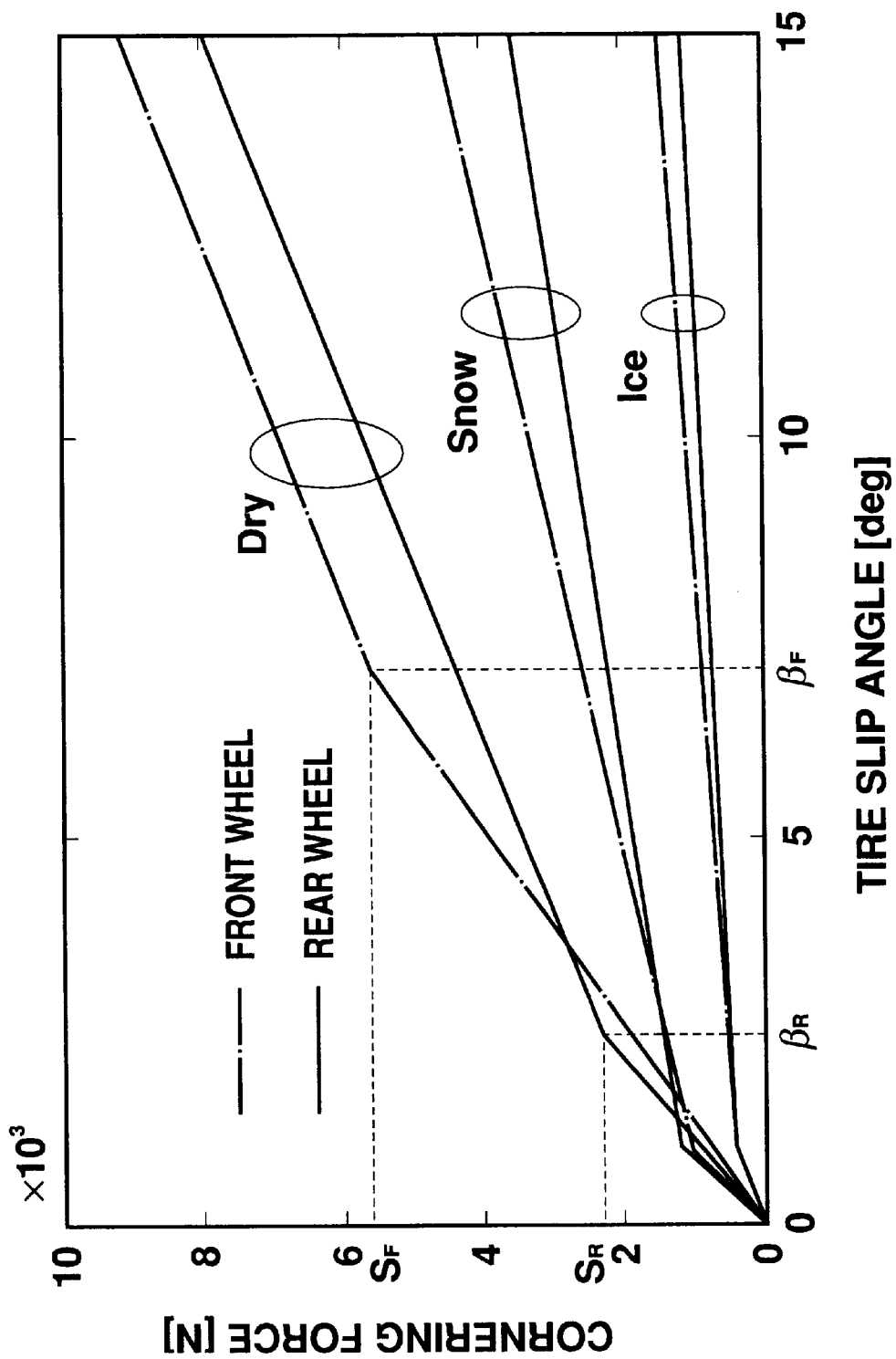
FIG. 12A is a graph showing another tire characteristic.

FIG. 12A shows tire characteristics for "a dry road", "a snow covered road", and "an icy road", the information being pre-loaded in the slip angle estimation sections 101a through 101c, shown in FIG. 11, respectively, for use in a slip angle estimation calculation. Note that "Dry" and "Snow" tire characteristics are identical to those shown in FIG. 3. The slip angle estimation section 101a calculates a slip angle based on a tire characteristic model for "a dry road", shown in FIG. 12A, using expression (4). Here, in actual driving, full slip is caused to the tires once the vehicle reaches limit condition, with a cornering force saturated. On the contrary, in this embodiment, a tire characteristic model without saturated characteristics, in which a cornering force increases uniquely as a tire slip angle becomes larger, as shown in FIG. 12A, is assumed for use in estimation of a slip angle. A slip angle calculated using the model shown in FIG. 12A naturally ends up being different from an actual slip angle due to saturated characteristics of an actual tire to be present once the vehicle reaches limit running condition. The present embodiment utilizes this fact in detection of a vehicle's limit running condition.

Figure 13:
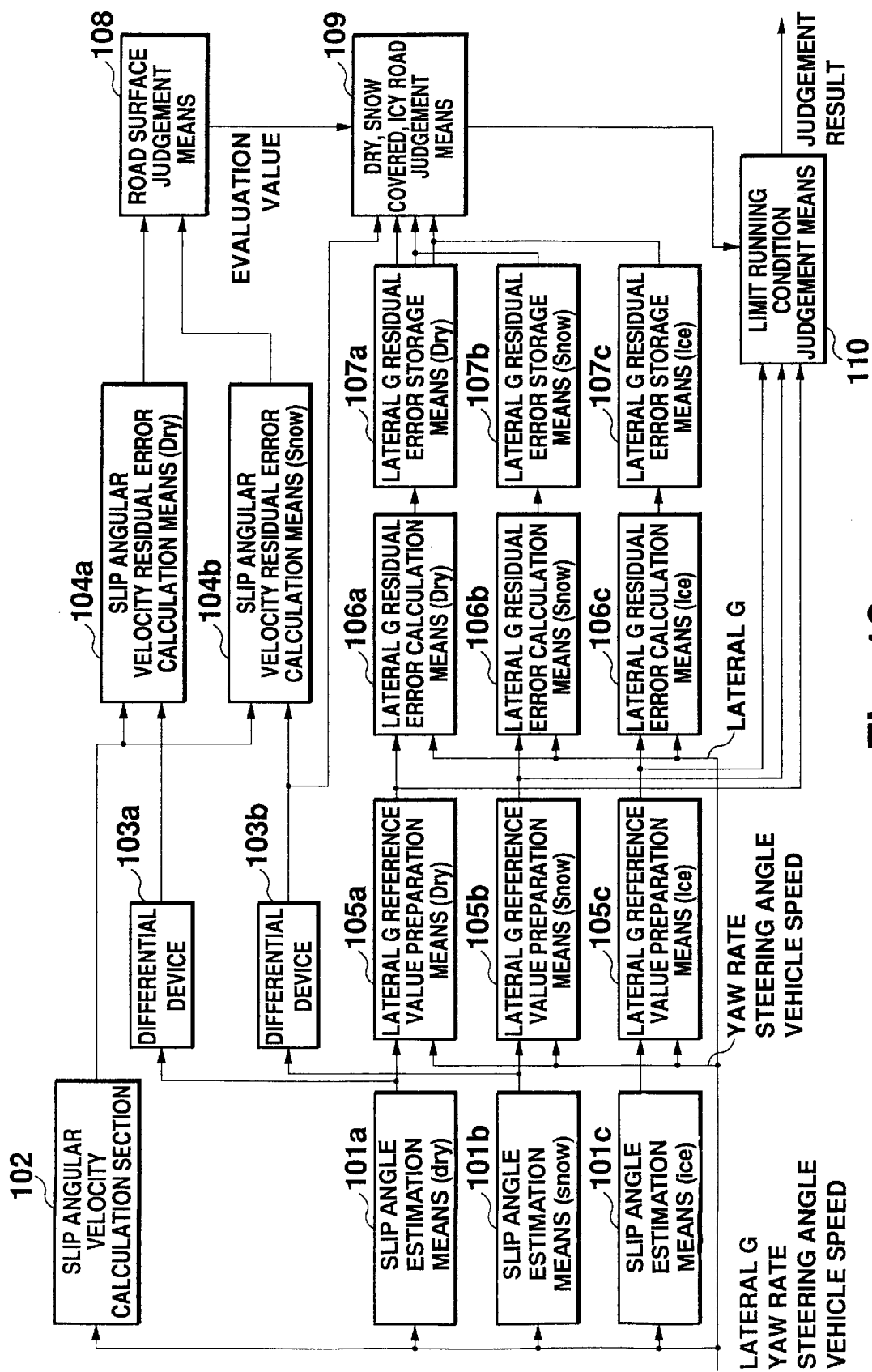
FIG. 13 is a block diagram showing a structure of a limit judgment device shown in FIG. 10.

FIG. 13 is a block diagram showing a structure of a limit judgment device 124 (see FIG. 10) of this preferred embodiment. The respective function blocks of the limit judgment device 124 may be realized by means of a microcomputer.

Slip angle estimation means 101a through 101c are the same as the slip angle estimation sections 101a through 101c shown in FIG. 11, and calculate slip angles β(^)Dry, β(^)Snow, β(^)Ice, respectively, using tire characteristics according to each road surface. Obtained data on the slip angles are supplied to lateral G reference value preparation means 105a through 105c, respectively.

Figure 12B:
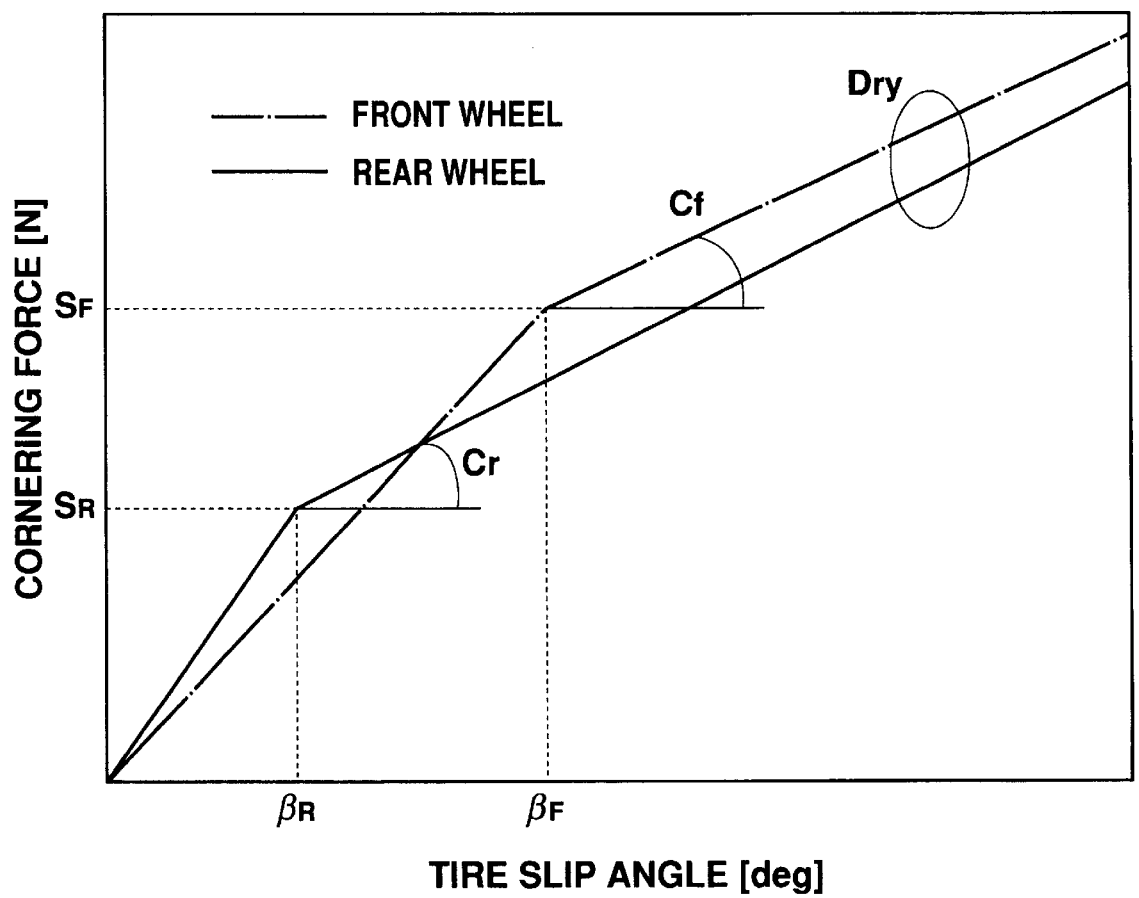
FIG. 12B is a partial enlarged diagram of FIG. 12A.

The lateral G reference value preparation means 105a through 105c calculate lateral G based on the supplied slip angles, using the following expression.

$$\ddot{y} = -\frac{Cf \cdot (\hat{\beta} + lf/V \cdot \dot{\theta} - \delta f - \beta_F) + S_F +}{m} \\ \frac{Cr \cdot (\hat{\beta} - lr/V \cdot \dot{\theta} - \beta_R) + S_R}{m} \quad (6)$$

wherein βF, SF, βR, and SR are tire slip angles and cornering forces at break points on the tire characteristic lines shown in FIG. 12A or FIG. 12B.

As described above, as full slip is caused to the tires in actual driving under limit running condition, and a cornering force is saturated, as described above, a lateral G value calculated based on the tire characteristics shown in FIG. 12A, i.e., a lateral G reference value output from the lateral G reference value preparation means 105a through 105c, comes to deviate from, to be specific, becomes larger than, an actual lateral G value. In other words, because of the tire characteristics shown in FIG. 12A, used in estimation of lateral G, a difference is caused between an estimation lateral G value and an actual lateral G value when the vehicle is under limit running condition.

In light of the above, such difference is strategically utilized in the limit running condition judgment means 110. Specifically, one of the lateral G reference values output from the lateral G reference value preparation means 105a through 105c, namely the one corresponding to the actual road surface, is compared with a predetermined lateral G limit value. When the lateral G reference value turns out to be in excess of a predetermined limit value, the vehicle is determined as being under limit running condition. A limit value for use in comparison by the limit running condition judgment means 110 may be appropriately determined depending on road surfaces, for example, as follows.

Dry road "Dry": 1.1G

Snow covered road "Snow": 0.65G

Icy road "Ice": 0.25G

These limit values are determined based on the limit values (shown below) which are determined on a friction force caused between the tire on a dry, snow covered, or icy road and the road surface, in consideration of the amount of an estimation error contained in a lateral G reference value.

Dry road "Dry": 0.8G

Snow covered road "Snow": 0.5G

Icy road "Ice": 0.2G

As described above, the limit judgment device 124 of this embodiment utilizes an increase of an estimation error in a lateral G estimation value due to the difference between non-linear tire characteristics and actual tire characteristics under limit running condition, to determine a vehicle's limit running condition. Therefore, conventionally required observation for a predetermined amount of time is unnecessary, and whether or not the vehicle has reached limit running condition can be promptly judged.

Here, other components of the limit judgment device 124 shown in FIG. 13 are used for judgment on road surface condition based on the estimated lateral G reference value. Specifically, lateral G residual error calculation means 106a through 106c calculate a difference (to be specific, a squared difference) between a calculated lateral G reference value and an actual lateral G value obtained on a sensor. For calculation of a residual error, a filter means (not shown) is provided for carrying out high-pass filtering of 0.1 Hz and low-pass filtering of 5 Hz to the lateral G reference value and a signal from the sensor for extraction of frequency components in a necessary band only for use later in difference operation.

The lateral G residual error storage means 107a through 107c store data on the residual error obtained in the lateral G residual error calculation means 106a through 106c in time series, and adds them up. Therefore, the storage means 107a through 107c resultantly store an accumulation value of squared differences.

Having received data on the residual errors, a dry, snow covered, icy road judgment means 109 determines the road surface condition corresponding to the smallest residual error as road surface condition (for example, it determines as a dry road when the residual error for a dry road is smaller than those for snow covered and icy roads), and outputs the result to the limit running condition judgment means 110. Preferably, the dry, snow covered, icy road judgment means 109 judges a road surface in consideration of the fact that an absolute value of a slip angular velocity for a snow covered road (a 3 Hz low-pass filter value) β()Snow, supplied from the differential device 103b, exceeds 0.1 rad/s, and an evaluation value obtained by the road surface judgment means 108. The road surface judgment means 108 evaluates road surface condition based on outputs from a slip angular velocity residual error calculation means for "Dry" 104a and from a slip angular velocity residual error calculation means for "Snow" 104b, and outputs, as an evaluation value, a ratio between the residual errors for dry and snow covered roads, i.e., Δβ()Snow/Δβ()Dry, wherein the slip angular velocity residual error calculation means for "Dry" 104a calculates a residual error of a slip angular velocity on a dry road, and the slip angular velocity residual error calculation means for "Snow" 104b calculates a residual error of a slip angular velocity on a snow covered road. The dry, snow covered, icy road judgment means 109 unconditionally judges that the current road surface is dry in response to an evaluation value from the road surface judgment means 108 equal to or more than a predetermined value (e.g., 5.0). With an evaluation value below a predetermined value (i.e., with a larger residual error for a dry road), road surface condition corresponding to the smallest lateral G residual error is selected as current road surface condition.

Alternatively, judgment on road surface condition may be made based solely on the lateral G residual error stored in the lateral G residual error storage means 107a through 107c shown in FIG. 13 while eliminating the slip angular velocity calculation means 102, the differential devices 103a and 103b, the slip angular velocity residual error calculation means 104a and 104b, and the road surface judgment means 108.

Referring to FIGS. 15A through 17D, road surface judgment processing will be described in detail.

Figure 15A:
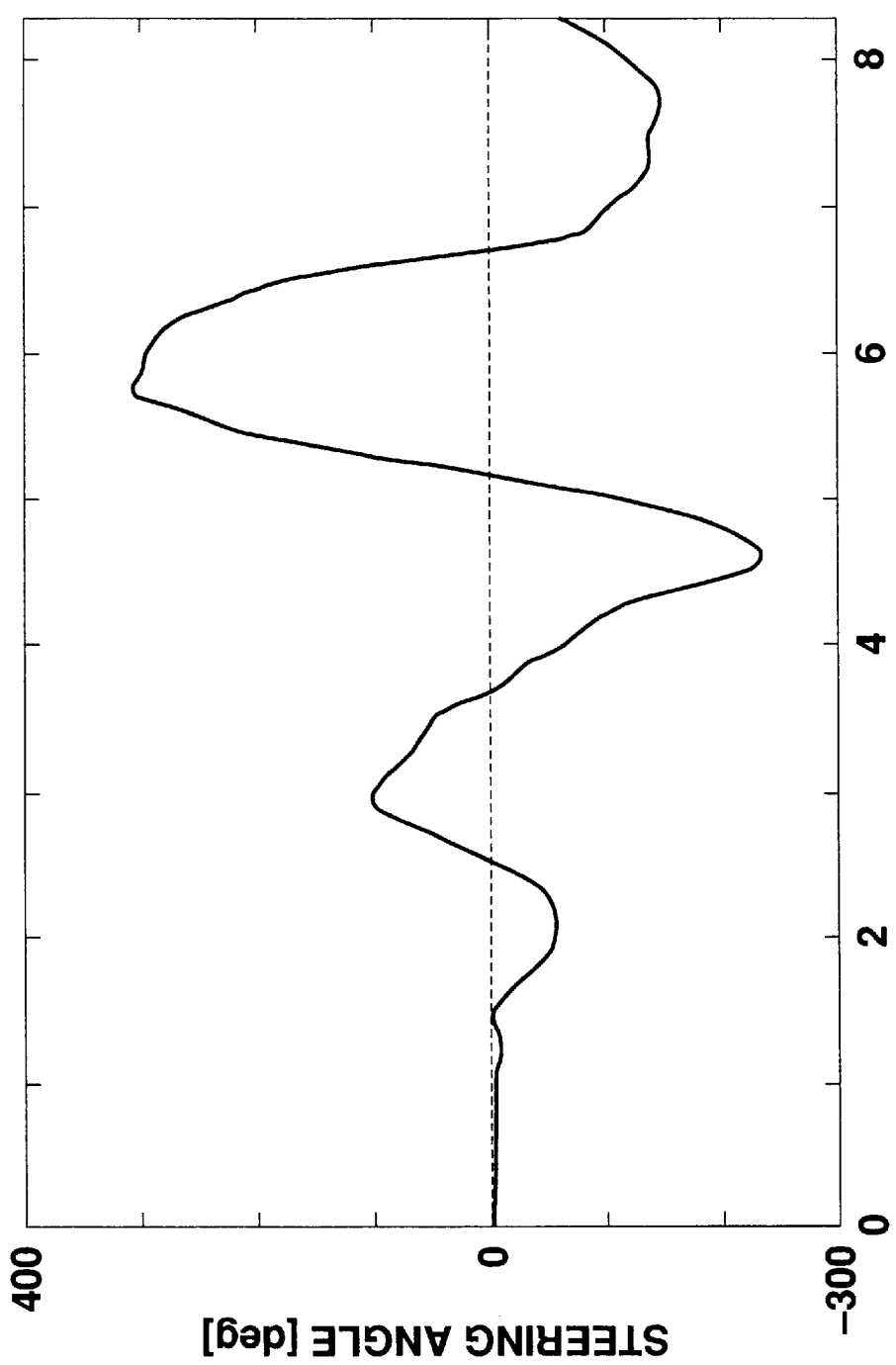
FIG. 15A is a graph showing changes with time of a steering angle in the case of a snow covered road.
Figure 15B:
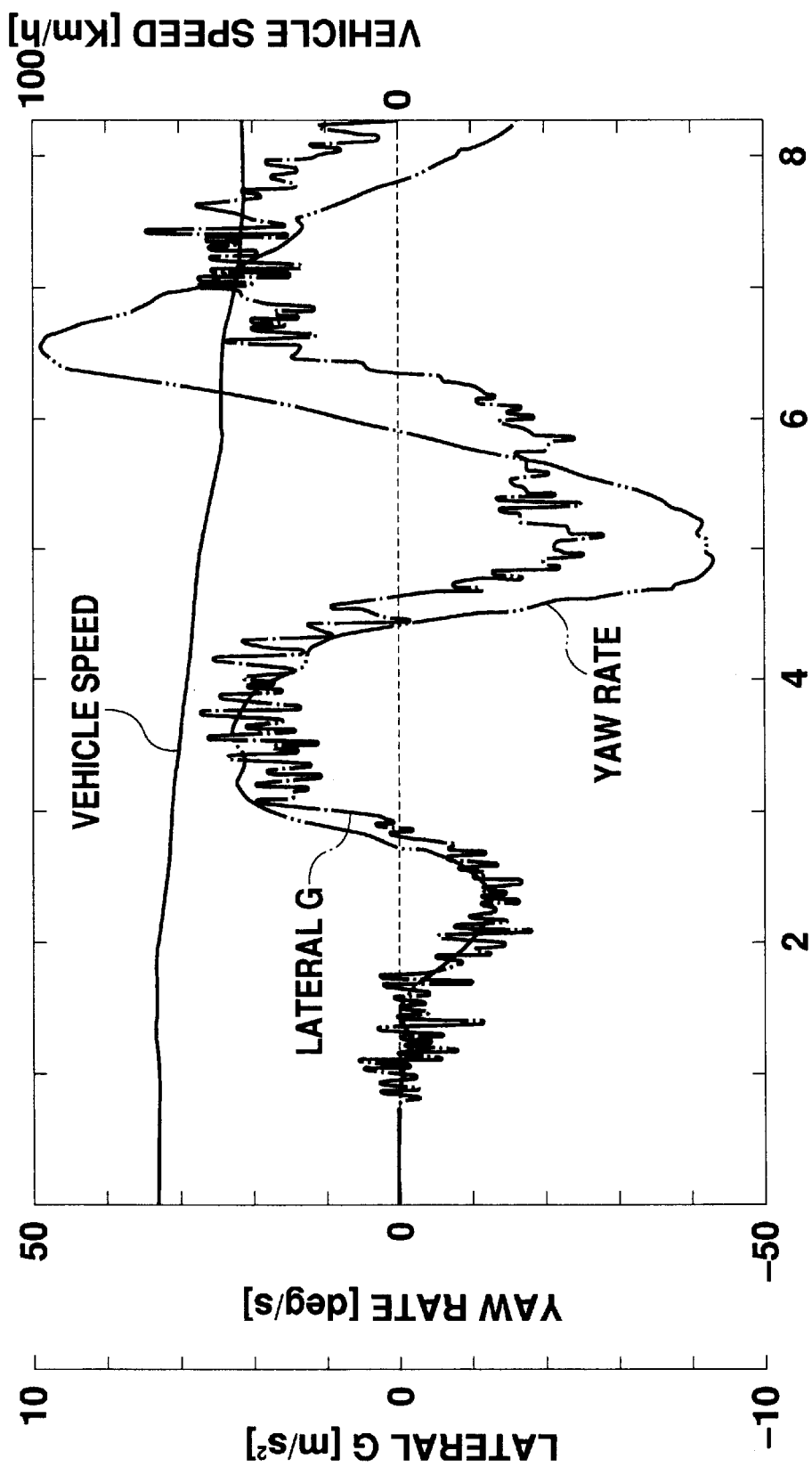
FIG. 15B is a graph showing changes with time of a yaw rate and lateral G in the case of a snow covered road.
Figure 15C:
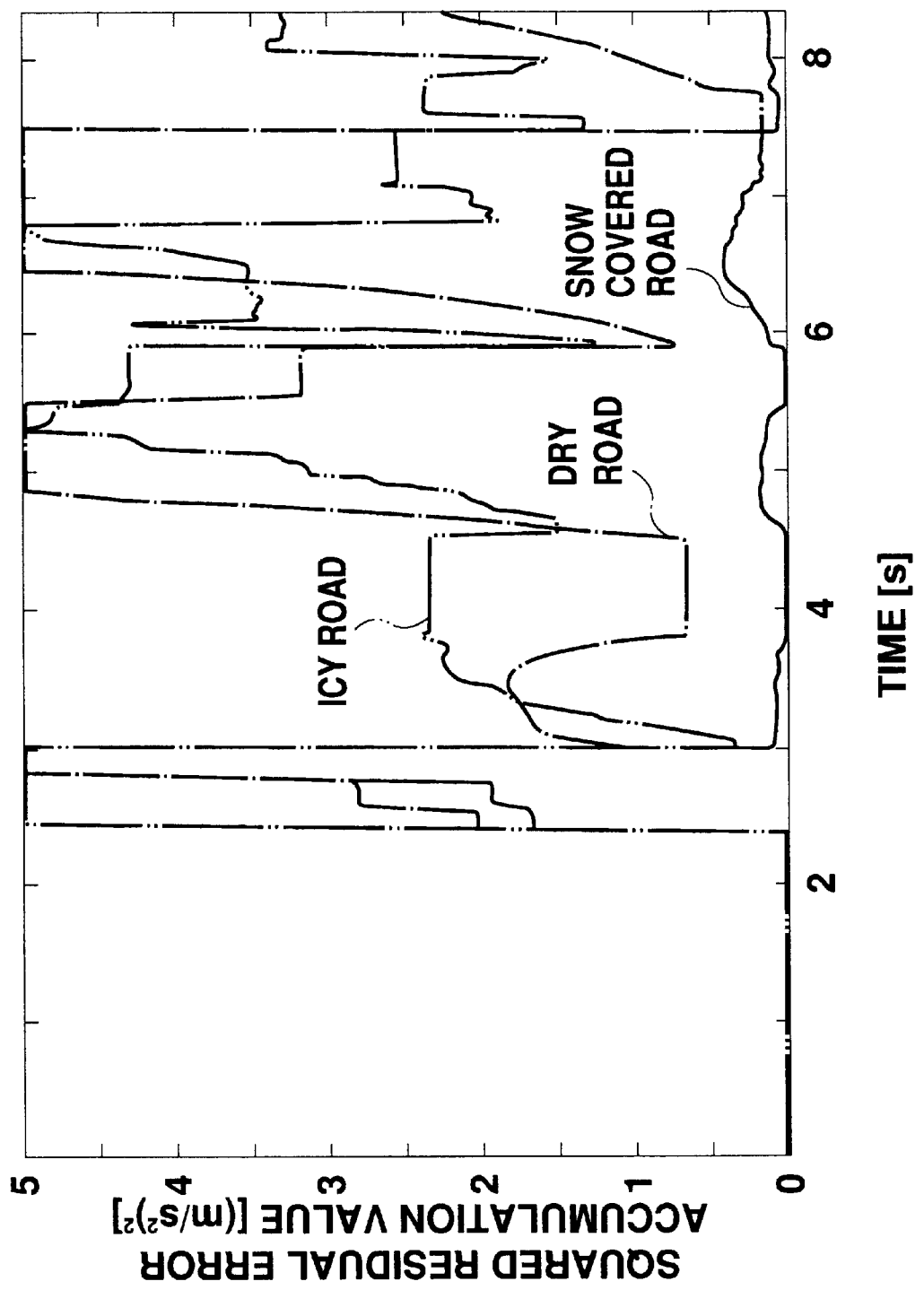
FIG. 15C is a graph showing changes with time of a squared residual error accumulation value in the case of a snow covered road.
Figure 15D:
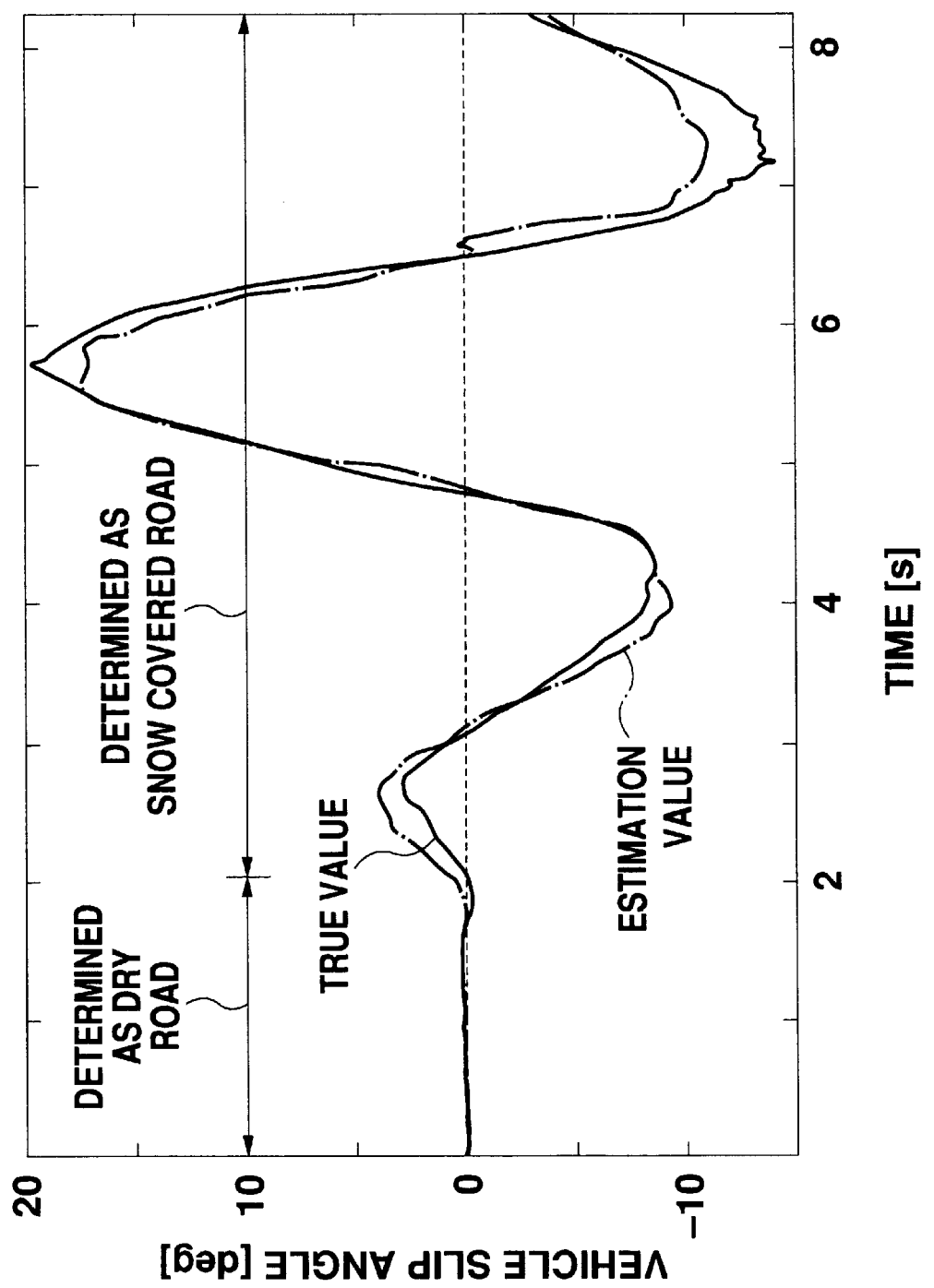
FIG. 15D is a graph showing changes with time of a slip angular velocity concerning a snow covered road.

FIGS. 15A through 15D show a change with time of a detection steering angle (FIG. 15A), detection lateral G, a detection yaw rate, and a vehicle speed (FIG. 15B), a squared residual error accumulation value stored in the lateral G residual error storage means 107a through 107c (FIG. 15c), and true and estimation values of a vehicle slip angle (FIG. 15D) when the vehicle slaloms from a dry to a snow covered road. The important factor in judgment on road surface condition is a squared residual error accumulation value shown in FIG. 15C. The dry, snow covered, icy road judgment means 109 determines the road surface condition corresponding to the smallest residual error as current road surface condition. As is known from FIG. 15C, residual errors for icy and dry roads increase in about two seconds, leaving the residual error for a snow covered road as the smallest. Therefore, the judgment means 109 determines that the road where the vehicle currently runs has changed from a dry road to a snow covered road, as shown in FIG. 15D.

Figure 16A:
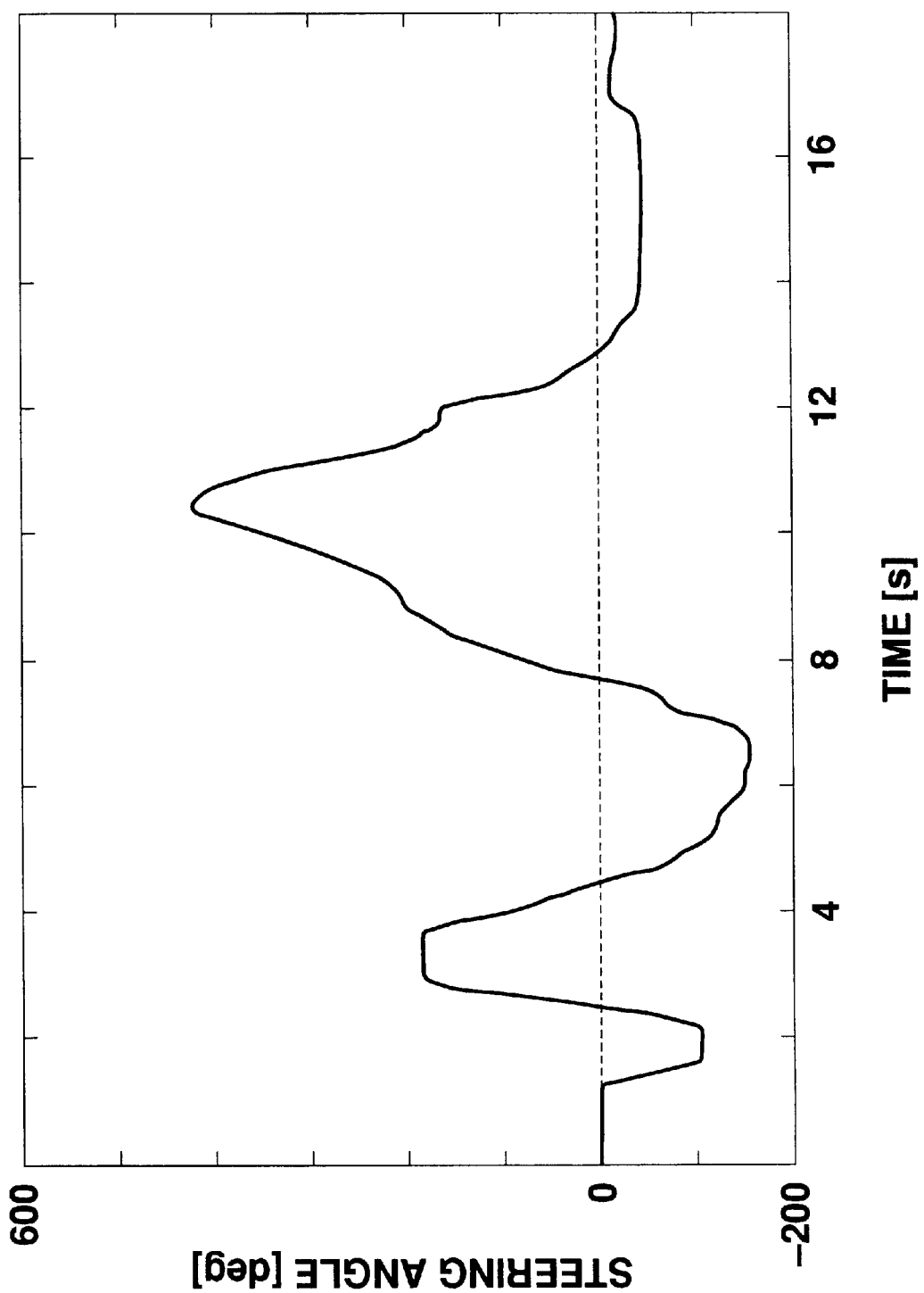
FIG. 16A is a graph showing changes with time of a steering angle in the case of an icy road.
Figure 16B:
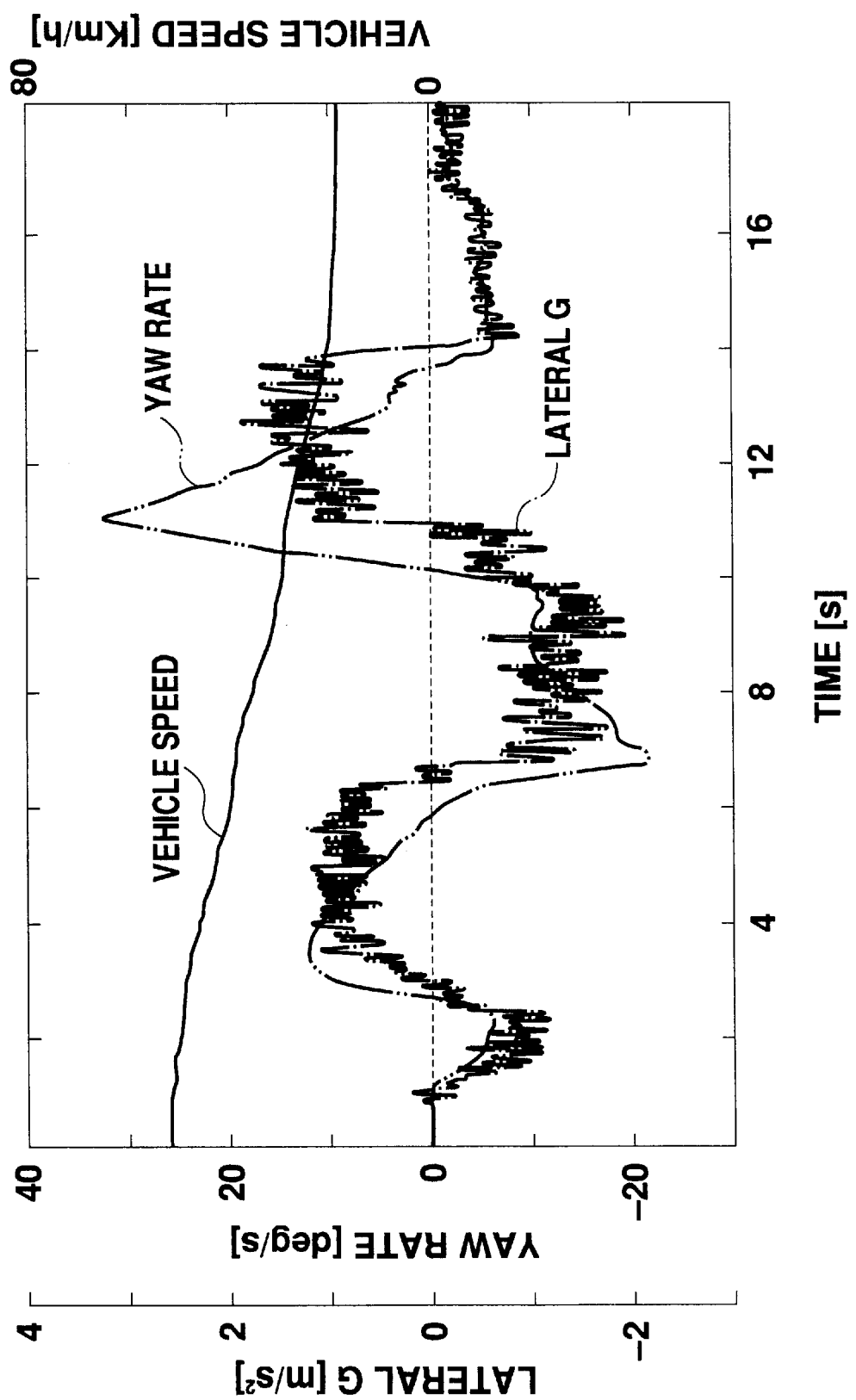
FIG. 16B is a graph showing changes with time of a yaw rate and lateral G in the case of an icy road.
Figure 16C:
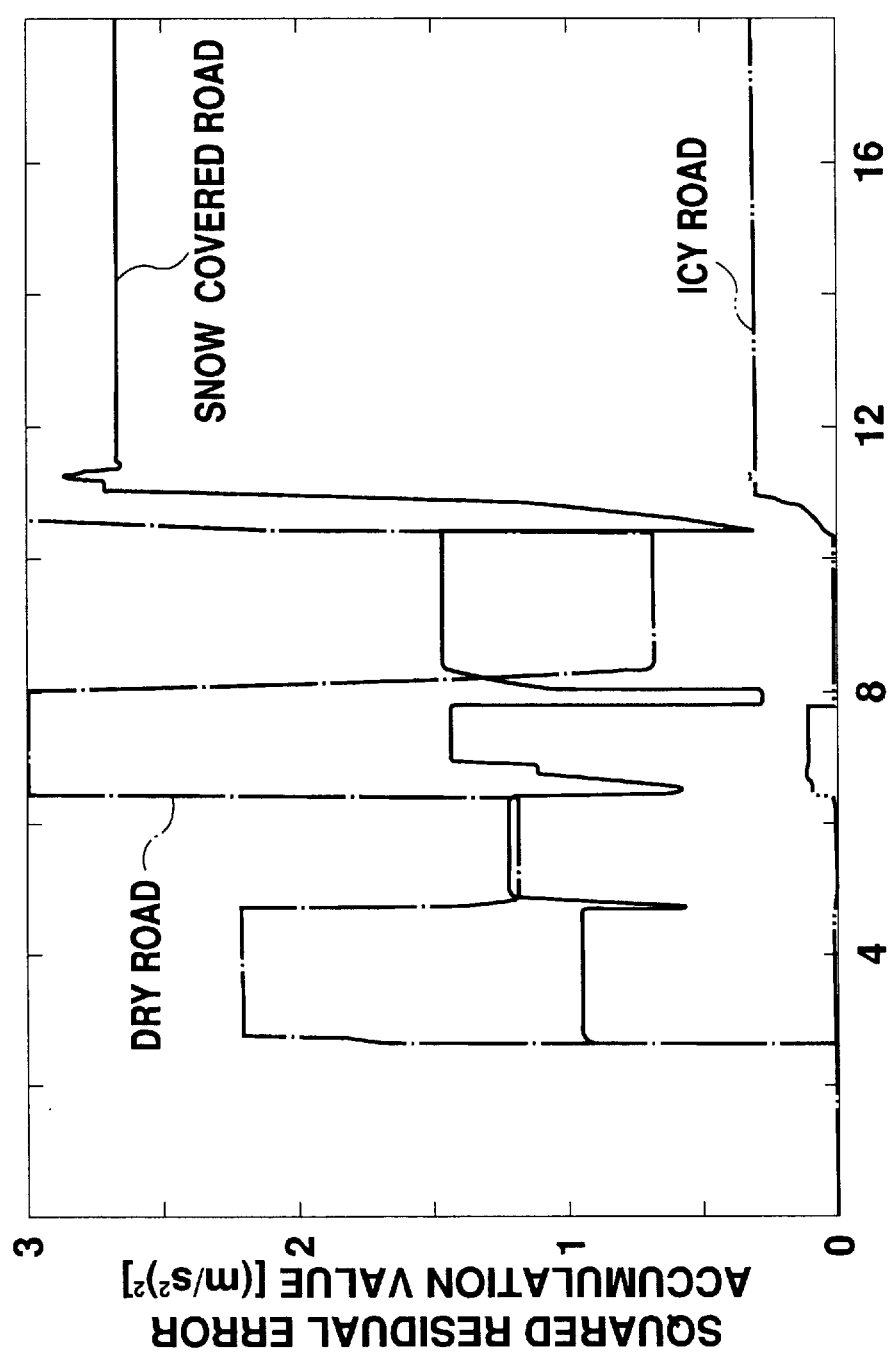
FIG. 16C is a graph showing changes with time of a squared residual error accumulation value in the case of an icy road.
Figure 16D:
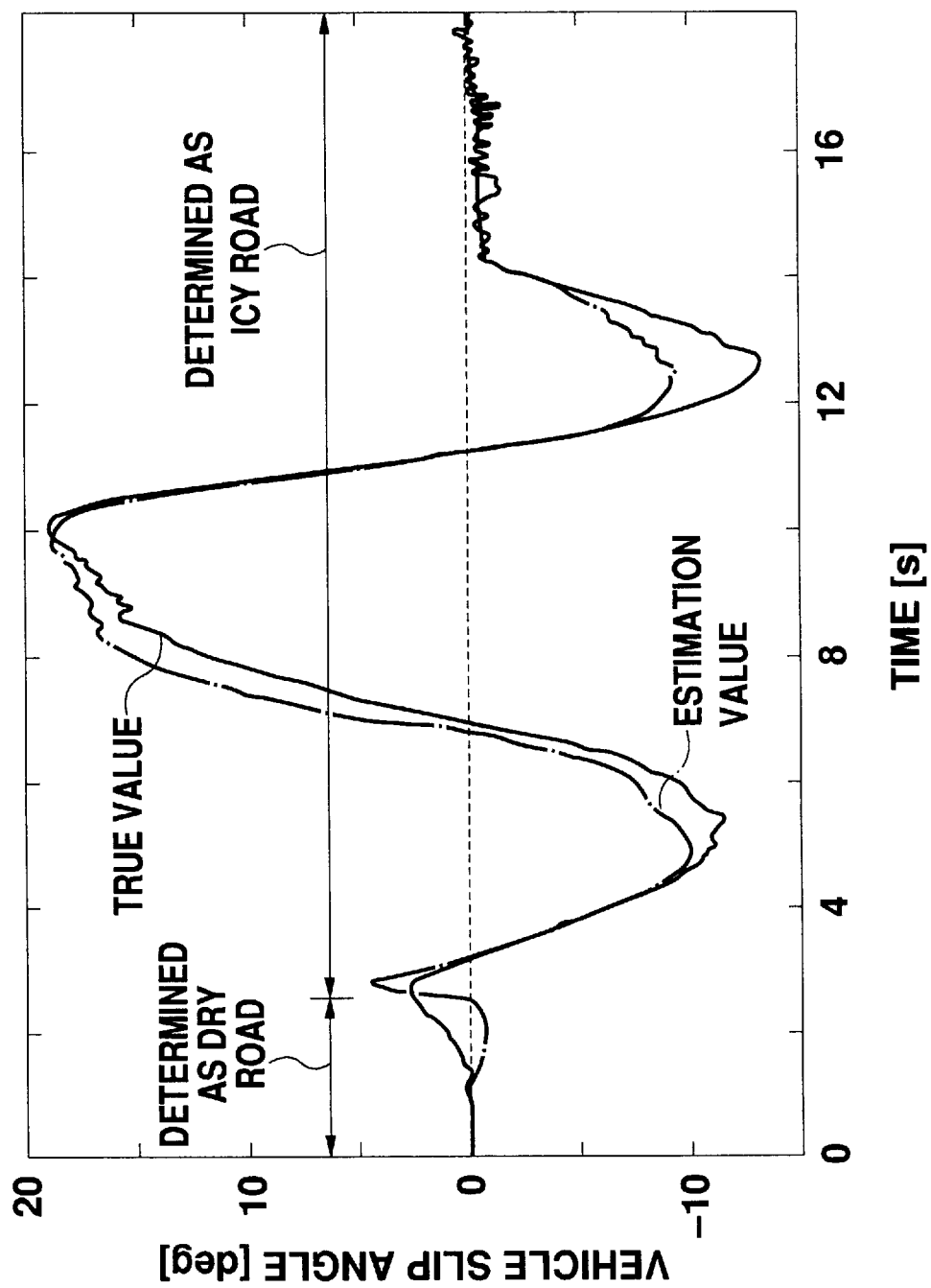
FIG. 16D is a graph showing changes with time of a slip angular velocity in the case of an icy road.

FIGS. 16A through 16D show a change with time of a detection steering angle (FIG. 16A), detection lateral G, a detection yaw rate, and a vehicle speed (FIG. 16B), a squared residual error accumulation value stored in the lateral G residual error storage means 107a through 107c (FIG. 16c), and true and estimation values of a vehicle slip angle (FIG. 16D) when the vehicle slaloms from a dry to an icy road. As is known from FIG. 16C, residual errors for dry and snow covered roads increase in about two seconds, leaving the residual error for an icy road as the smallest. Therefore, the judgment means 109 determines that the road where the vehicle runs has changed from a dry road to an icy road, as shown in FIG. 16D.

Figure 17A:
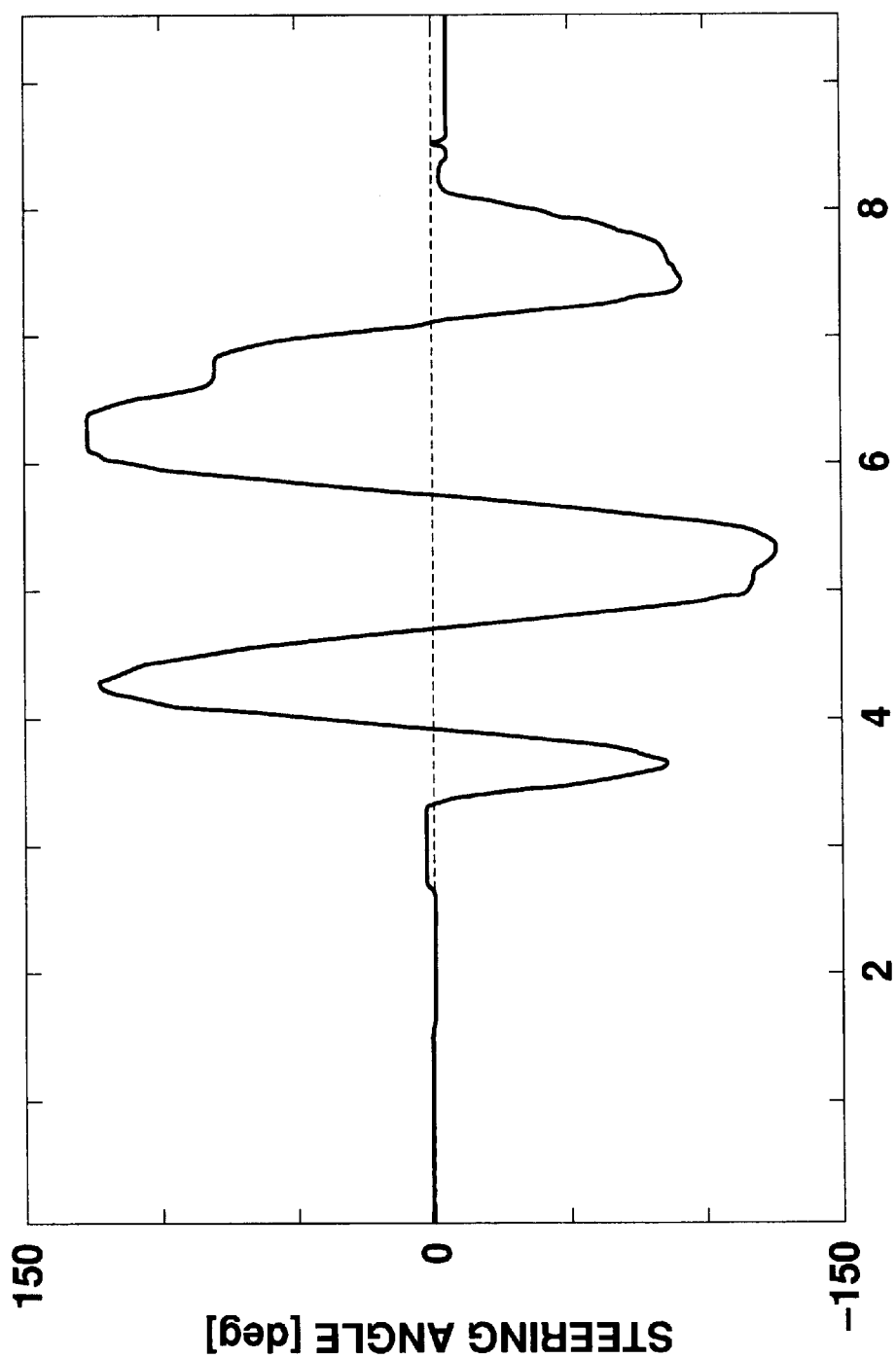
FIG. 17A is a graph showing changes with time of a steering angle in the case of a dry road.
Figure 17B:
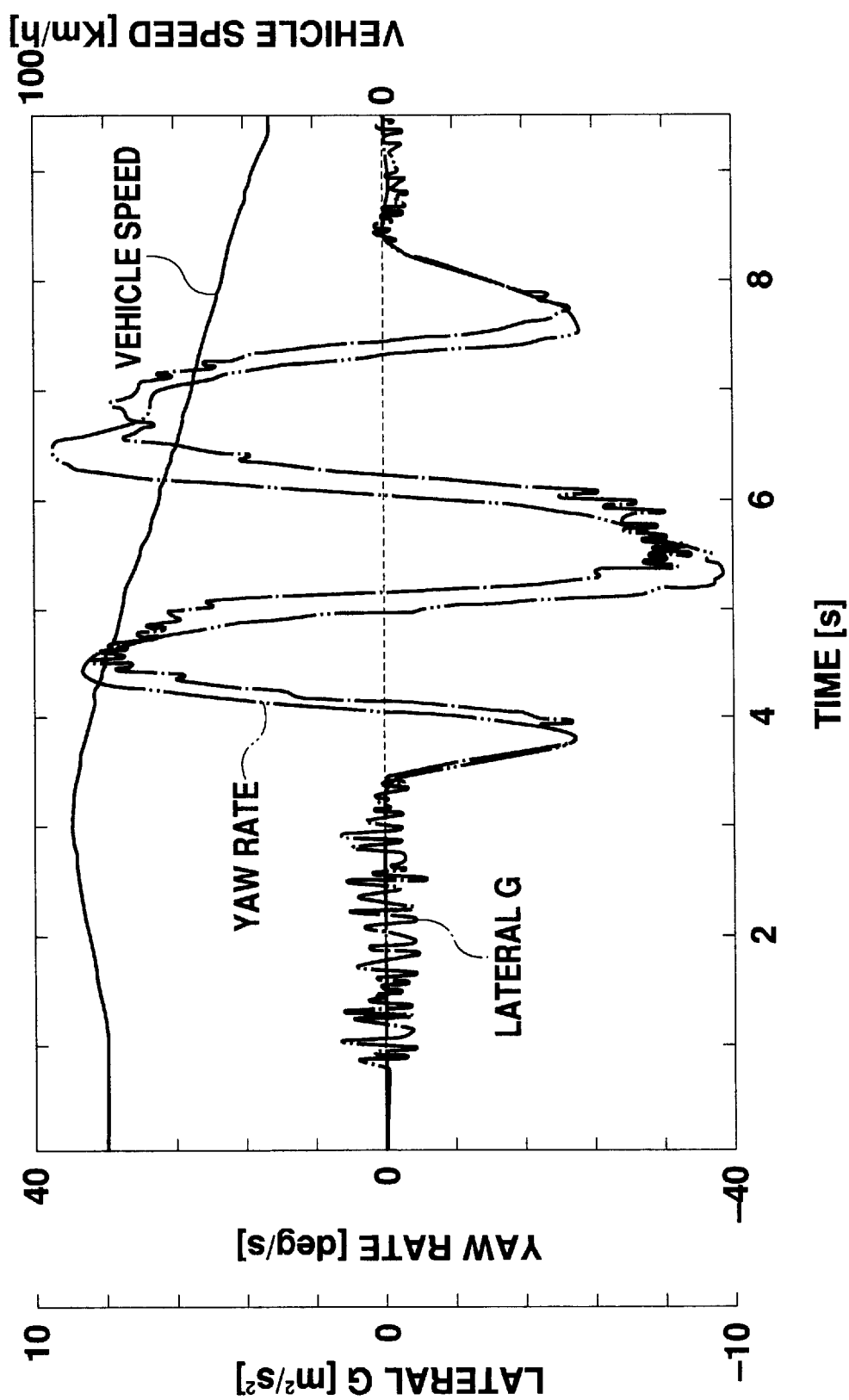
FIG. 17B is a graph showing changes with time of a yaw rate and lateral G in the case of a dry road.
Figure 17C:
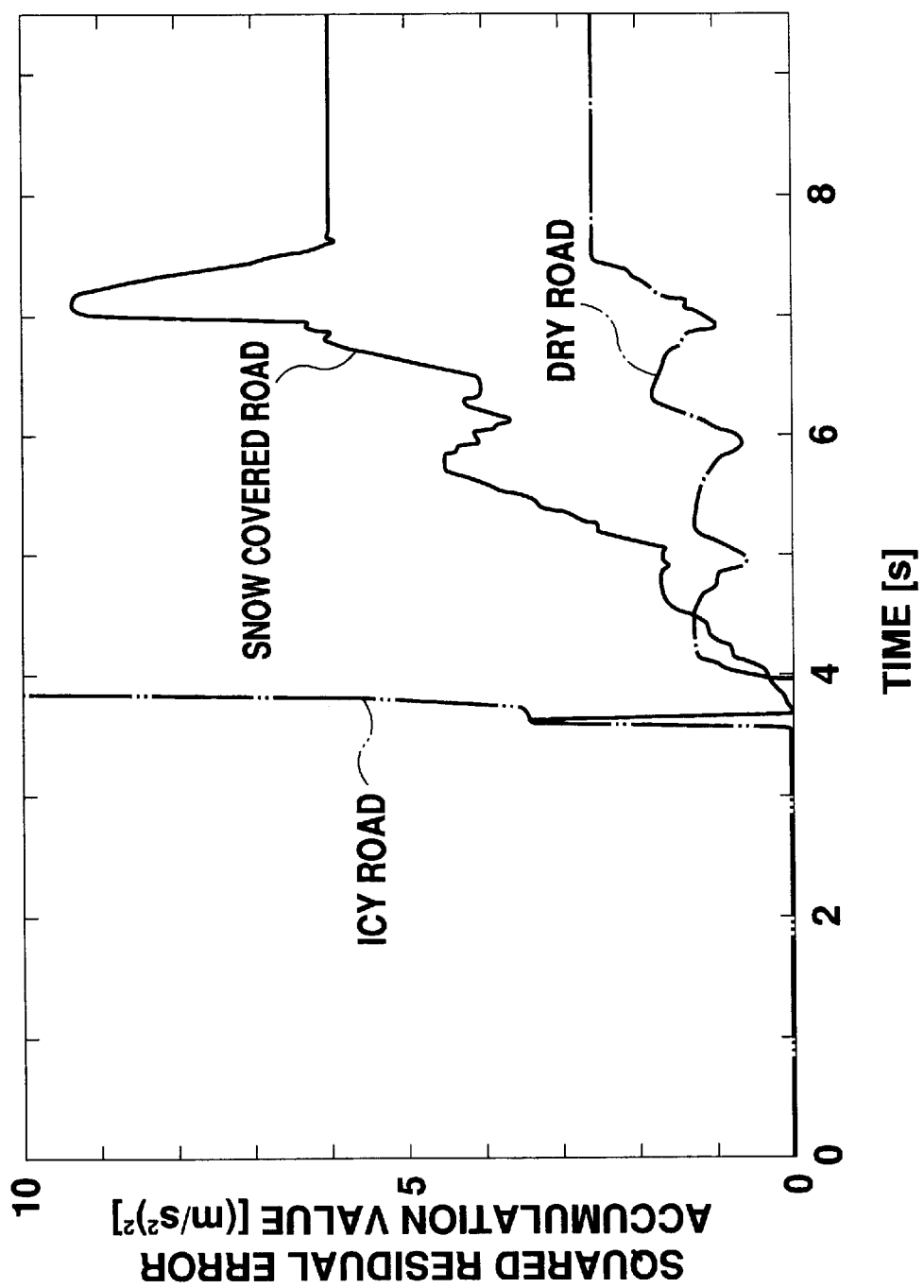
FIG. 17C is a graph showing changes with time of a squared residual error accumulation value in the case of a dry road.
Figure 17D:
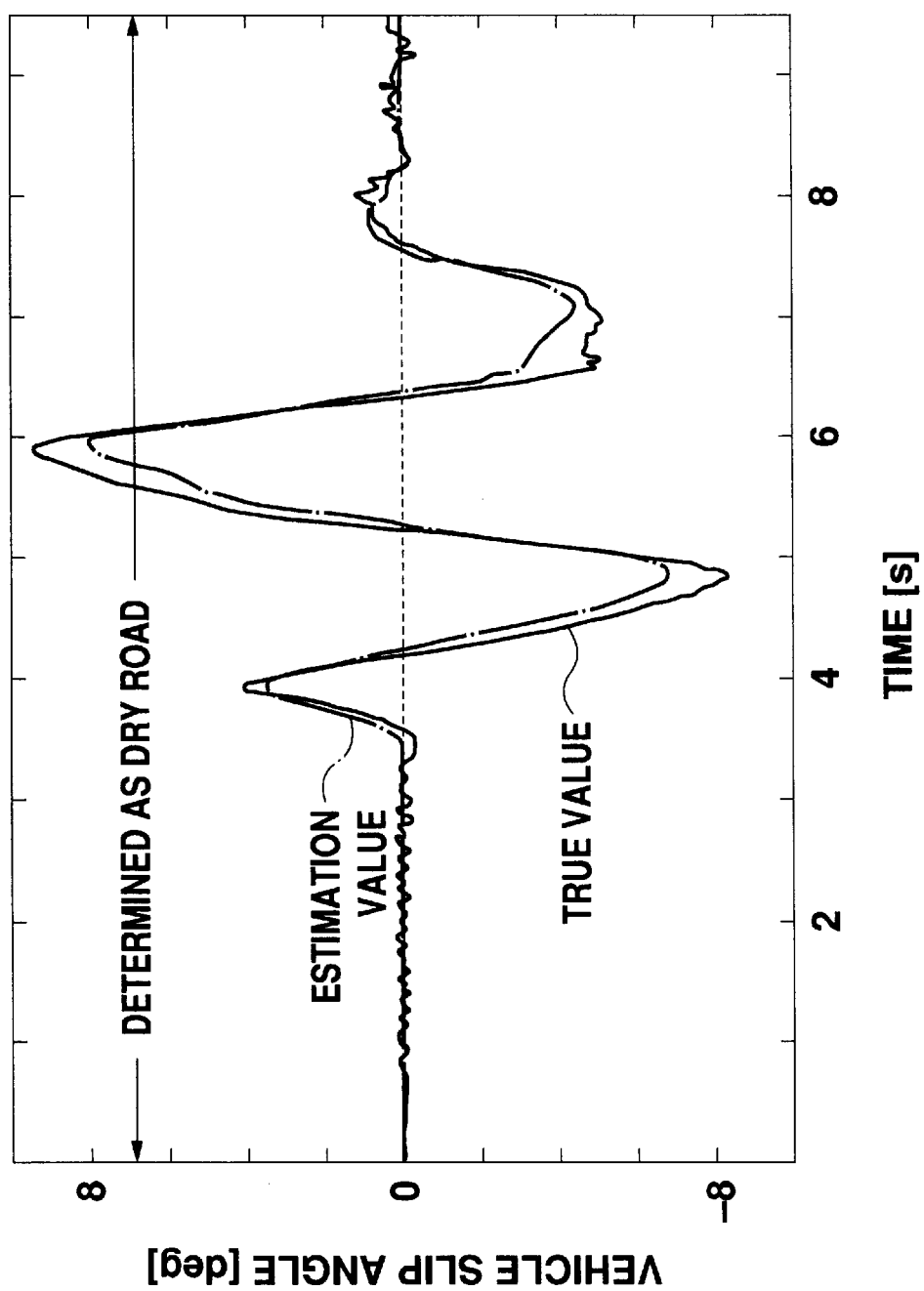
FIG. 17D is a graph showing changes with time of a slip angular velocity in the case of a dry road.

FIGS. 17A through 17D show a change with time of a detection steering angle (FIG. 17A), detection lateral G, a detection yaw rate, and a vehicle speed (FIG. 17B), a squared residual error accumulation value stored in the lateral G residual error storage means 107a through 107c (FIG. 17C), and true and estimation values of a vehicle slip angle (FIG. 17D) when the vehicle slaloms on a dry road. Residual errors for icy and snow covered roads are large, leaving that for a dry road the smallest. Therefore, the judgment means 109 determines that the road surface where the vehicle currently runs is a dry road, as shown in FIG. 17D. Note that although the residual error for a snow covered road is smaller than that for a dry road by around four minutes in FIG. 17C, that is, the smallest among the three, the judgment section 109 can judge correctly even around that time point, determining that the road is not a snow covered road but a dry road. This is because the judgment section 109 is set so as to unconditionally determine that the road is a dry road when an evaluation value from the road surface judgment means 108 is equal to or more than a predetermined value (e.g., 5.0), or to select road surface condition corresponding to the smallest residual error when the evaluation value is below a predetermined value (i.e., a larger residual error for a dry road).

As described above, road surface condition can accurately be determined using a method other than the one using non-linear tire characteristics in this embodiment. The method other than the one using non-linear tire characteristics, in which road surface condition is judged using a lateral G residual error as shown in FIG. 13, is advantageous in that it requires a simple-structured hardware because the calculated lateral G reference value can be used both in judgments on road surface condition and on a vehicle's limit running condition.

Figure 14A:
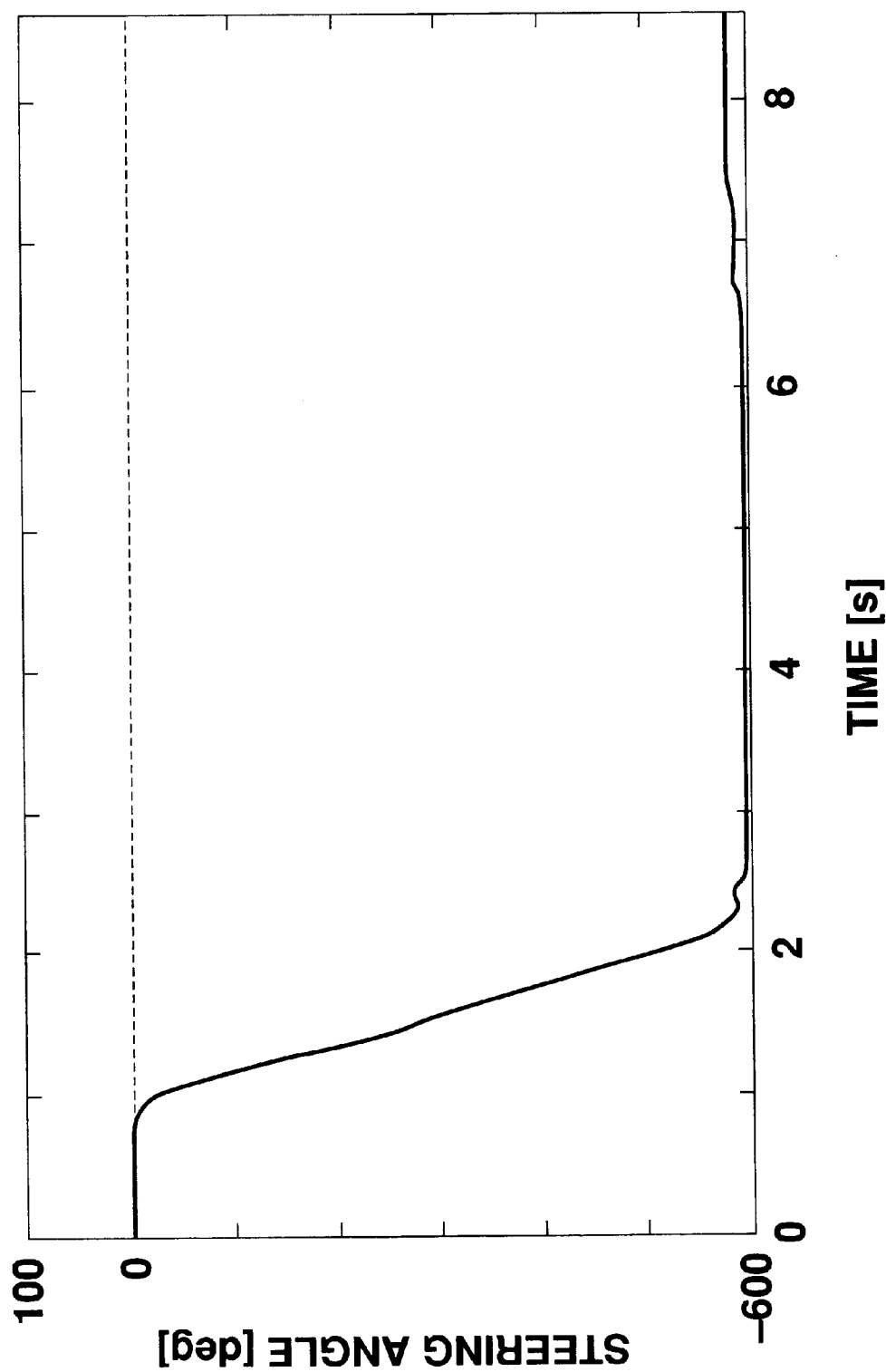
FIG. 14A is a graph showing changes of a steering angle with time.

FIGS. 14A through 14D show changes with time of a detection steering angle, a detection vehicle speed, detection lateral G, a detection yaw rate, estimation lateral G, and an estimation slip angle in accordance with another detection method of this embodiment. In particular, FIG. 14A shows a change with time of a steering angle detected on a sensor, in which a steering angle, initially in the position of neutral 0 (deg), is changed significantly to −600 (deg) at a certain time point.

Figure 14B:
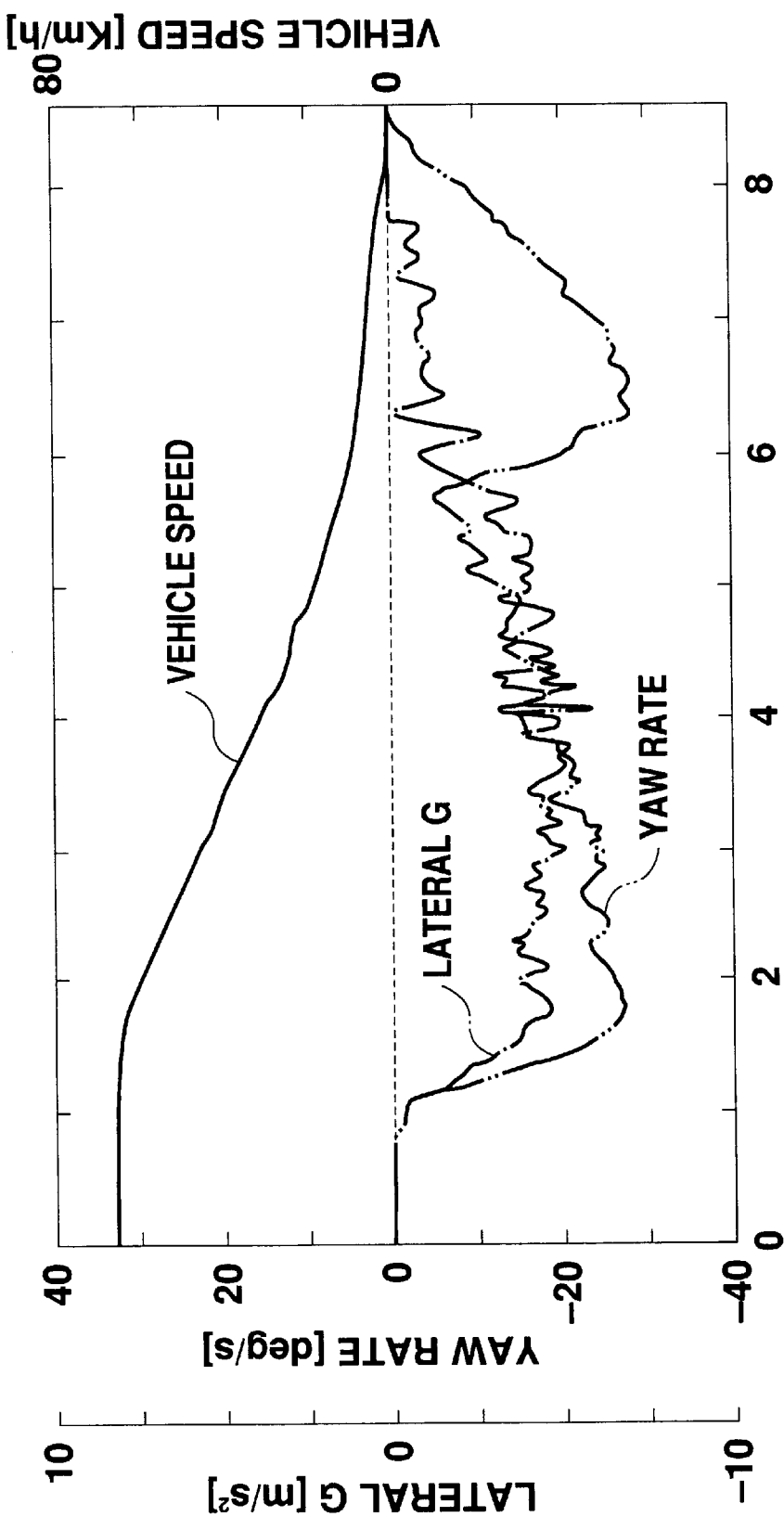
FIG. 14B is a graph showing changes of a yaw rate and lateral G with time.

FIG. 14B shows changes with time of a detection vehicle speed, detection lateral G, and a detection yaw rate when the steering angle is changed as shown in FIG. 14A. The vehicle speed, the lateral G, and the yaw rate vary as shown. A detection lateral G value reaches a substantial limit value at a relatively early stage of a vehicle's turning due to a saturating cornering force of a tire. However, the vehicle is yet to spin at this stage, and is apparently not under limit running condition. Therefore, if a detection lateral G value were referred to for activation of a vehicle stability control system or the like, the system would resultantly begin operation at an earlier timing than it should.

Figure 14C:
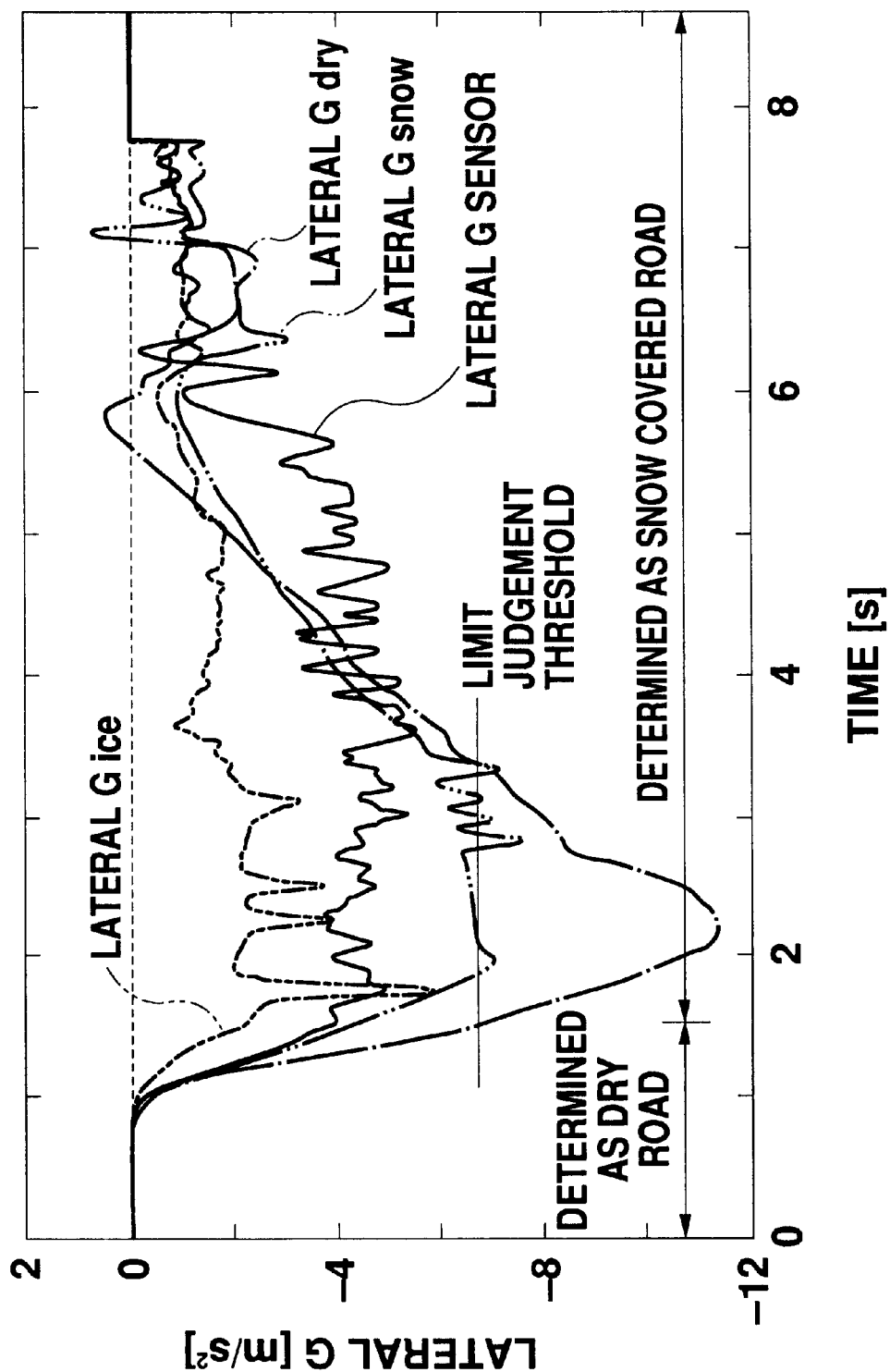
FIG. 14C is a graph showing changes with time of lateral G for respective assumed road surfaces.

FIG. 14C shows detection lateral G (the same as is shown in FIG. 14B but in a different scale) and estimation lateral G values obtained in the lateral G reference value preparation means 105a through 105c shown in FIG. 13 for respective assumed road surface conditions (dry, snow covered, and icy roads). The solid line indicates a lateral G value detected on a sensor; a one-dot broken line indicates an estimation G value for a dry road, calculated in the lateral G reference value preparation means for "Dry" 105a; a two-dot broken line indicates an estimation lateral G value for a snow covered road, calculated in the lateral G reference value preparation means for "Snow" 105b; and a three-dot broken line indicates an estimation lateral G value for an icy road, calculated in the lateral G reference value preparation means for "Ice" 105c.

Also shown in the drawing is road surface condition determined by the dry, snow covered, icy road judgment means 109. As is shown, a road surface condition judgment result is changed from a dry road to a snow covered road around 1.5 seconds. This means, as described above, that road surface condition with the smallest lateral G residual error has changed from a dry road to a snow covered road. A limit judgment threshold value to be referred to in comparison by the limit running condition judgment means 110 is also shown. When an estimation lateral G value for a snow covered road, or lateral G snow, is in excess of the limit judgment threshold (=0.65G), it is determined that the vehicle is under limit running condition. Attention should be paid to the fact that a detection lateral G value differs significantly from estimation lateral G values, particularly, that for a snow covered road, with the estimation lateral G being larger than the detection lateral G. This is caused because modeling non-linear tire characteristics are different from actual tire characteristics with the vehicle under limit running condition.

Figure 14D:
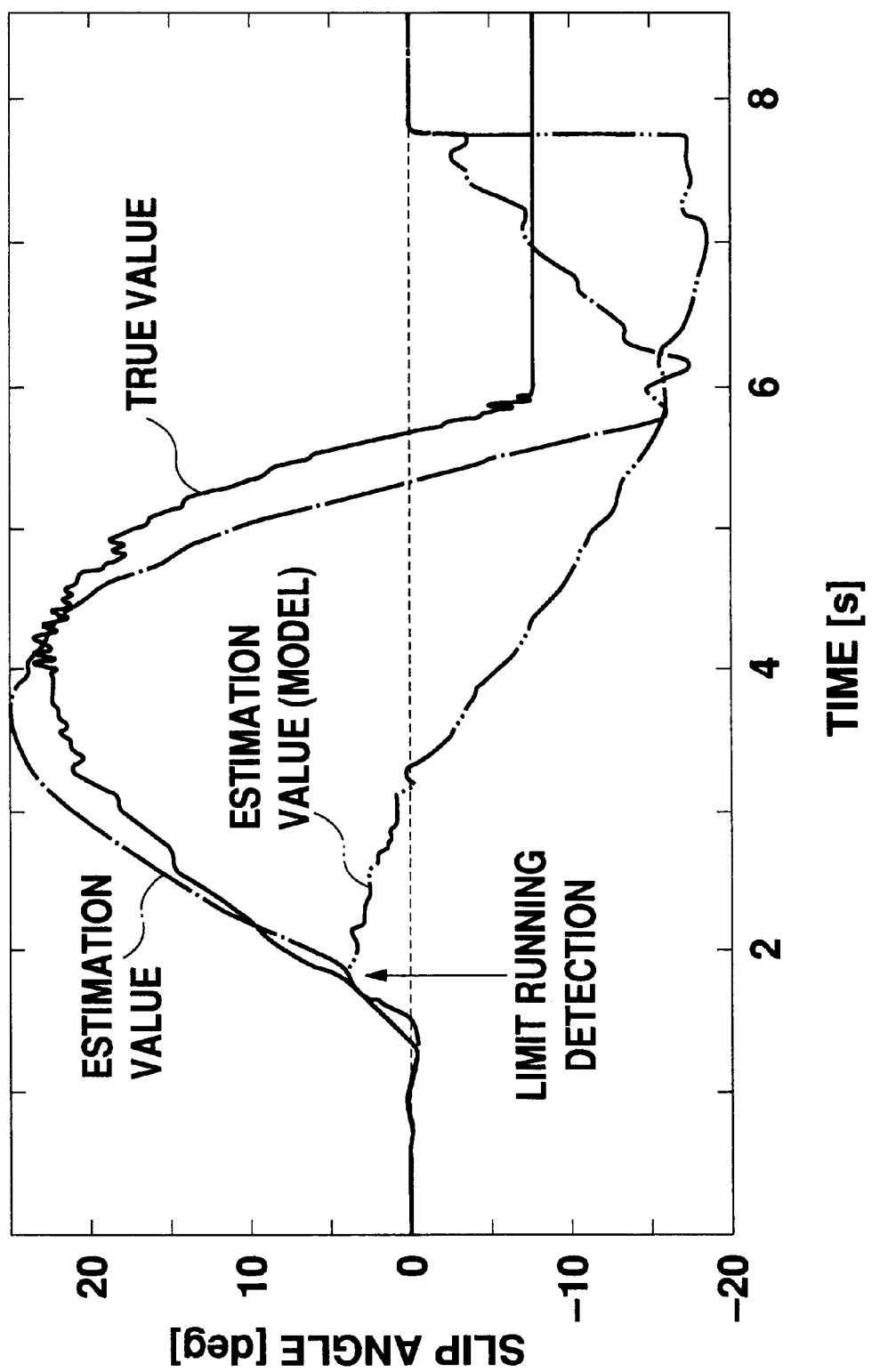
FIG. 14D is a graph showing changes with time of a slip angular velocity.

FIG. 14D shows a true value of a vehicle slip angle, a change with time of a vehicle slip angle estimated using a structure of this embodiment shown in FIG. 10, and a time for limit running detection. For a comparison purpose, a slip angle which is estimated using only the non-linear model based estimation system 122 shown in FIG. 10 (i.e., a slip angle which is estimated based solely on a non-linear model, but not on the limit judgment device 124 in FIG. 10) is also shown in the drawing. The solid, one-dot, and two-dot lines respectively indicate a true value of a vehicle slip angle, a slip angle estimated using the structure shown in FIG. 10, and a slip angle estimated using the non-liner model based estimation system 122 alone.

According to a method of this embodiment, in which a vehicle under limit running condition is determined from an estimation lateral G value for a snow covered road being in excess of a limit judgment threshold so that the estimation system 122 shown in FIG. 10 is used in estimation of a slip angle before the vehicle reaches limit running condition and the integration system 120 is used thereafter, it is appreciated that the obtained estimation value is close to the true value, indicated by the solid line. On the other hand, when the non-liner model based estimation system 122 is used for the estimation even after the vehicle has reached limit running condition, a difference between estimation and true values widens due to discrepancy between modeling non-linear tire characteristics and actual tire characteristic under limit running condition.

As described above, in this embodiment, imaginary non-linear tire characteristics without saturation characteristic are assumed, and a vehicle's limit running condition is promptly and reliably detected thereupon to know appropriate timing for switching estimation methods for a vehicle slip angle. Therefore, an accurate slip amount can be known.

What is claimed is:

1. A vehicle running condition judgment device, comprising:
    detection means for detecting a state quantity concerning motion of a vehicle;
    memory means for storing non-linear tire characteristics for each of a plurality of assumed road surfaces;
    slip angle estimation means for estimating in parallel a vehicle slip angle for each of the plurality of assumed road surfaces based on the state quantity and the non-linear tire characteristics;
    feedback compensation means for compensating the vehicle slip angle for each of the plurality of assumed road surfaces by compensating a currently estimated vehicle slip angle for each of the plurality of assumed road surfaces based on a current state quantity and a last vehicle slip angle having been estimated for respective assumed road surfaces; and
    judgment means for judging current road surface condition based on the vehicle slip angle compensated by said feedback compensation means.

2. A vehicle running condition judgment device according to claim 1, wherein the non-linear tire characteristics show non-saturated characteristics.

3. A vehicle running condition judgment device according to claim 2, wherein said judgment means comprises
    estimation angular velocity calculation means for calculating a vehicle slip angular velocity for each of the plurality of assumed road surfaces as an estimation angular velocity based on the vehicle slip angle compensated by said feed-back compensation means for each of the plurality of assumed road surfaces,
    detection angular velocity calculation means for calculating a vehicle slip angular velocity as a detection angular velocity based on the state quantity, and
    road surface condition judgment means for judging a current road surface condition through comparison between the detection angular velocity and the estimation angular velocity.

4. A vehicle running condition judgment device according to claim 3, wherein said road surface condition judgment means determines at least a high $\mu$ road and a low $\mu$ road.

5. A vehicle running condition judgment device according to claim 2, wherein said judgment means comprises
    estimation lateral acceleration calculation means for calculating a lateral acceleration for each of the plurality of assumed road surfaces as an estimation lateral acceleration based on the non-linear tire characteristics and the vehicle slip angle compensated by said feed-back compensation means for each of the plurality of assumed road surfaces;
    lateral acceleration difference storing means for storing a time sequence value of the differences between the detected lateral acceleration and the estimated estimation lateral acceleration; and
    road surface condition judgment means for judging a current road surface condition by selecting a minimum value from the accumulated values of the stored time sequence value of differences for each road surface.

6. A vehicle running condition detection device according to claim 5, wherein said road surface judgment means determines at least any of a dry road, a snow covered road, and an icy road.

7. A vehicle running condition judgment device, comprising:
    detection means for detecting a state quantity concerning motion of a vehicle;
    memory means for storing non-linear tire characteristics for each of a plurality of assumed road surfaces, wherein the non-linear tire characteristics show non-saturated characteristics;
    slip angle estimation means for estimating a vehicle slip angle for each of the plurality of assumed road surfaces based on the state quantity and the non-linear tire characteristics;
    feedback compensation means for compensating the vehicle slip angle for each of the plurality of assumed road surfaces by compensating a currently estimated vehicle slip angle for each of the plurality of assumed road surfaces based on a current state quantity and a last vehicle slip angle having been estimated for respective assumed road surfaces;
    judgment means for judging current road surface condition based on the vehicle slip angle compensated by said feedback compensation means; and
    limit condition judgment means for judging whether or not the vehicle is under a limit condition through comparison between a predetermined limit value and an estimation lateral acceleration corresponding to the current road surface condition judged by said road surface condition judgment means, the estimation lateral acceleration being selected from estimation lateral accelerations calculated by said estimation lateral acceleration calculation means for respective assumed road surfaces, wherein said judgment means comprises
        estimation lateral acceleration calculation means for calculating a lateral acceleration for each of the plurality of assumed road surfaces as an estimation lateral acceleration based on the non-linear tire characteristics and the vehicle slip angle compensated by said feed-back compensation means for each of the plurality of assumed road surfaces, and
        road surface condition judgment means for judging a current road surface condition through comparison between a detected lateral acceleration and the estimation lateral acceleration.

8. A vehicle running condition detection device, comprising:
   detection means for detecting a state quantity concerning motion of a vehicle;
   memory means for storing non-linear tire characteristics for each of a plurality of assumed road surfaces;
   slip angle estimation means for estimating a vehicle slip angle for each of the plurality of assumed road surfaces based on the state quantity and the non-linear tire characteristics;
   feedback compensation means for compensating the vehicle slip angle for each of the plurality of assumed road surfaces by compensating a currently estimated vehicle slip angle for each of the plurality of assumed road surfaces based on a current state quantity and a last vehicle slip angle having been estimated for the respective assumed road surfaces,
   lateral acceleration estimation means for estimating a lateral acceleration for each of the plurality of assumed road surfaces based on the non-linear tire characteristics and the vehicle slip angle compensated by said feedback compensation means; and
   limit condition judgment means for judging whether or not the vehicle is under a limit condition through comparison between a predetermined limit value and a lateral acceleration corresponding to an actual road surface condition, the lateral acceleration being selected from lateral accelerations estimated by said lateral acceleration estimation means for respective assumed road surfaces.

9. A vehicle running condition detection device according to claim 8, wherein the non-linear tire characteristics are non-saturated characteristics.

10. A vehicle running condition detection device according to claim 9, wherein the actual road surface condition is determined based on lateral accelerations estimated by said lateral acceleration estimation means for the respective assumed road surfaces.

11. A vehicle running condition detection device according to claim 9, wherein the actual road surface condition is one of the plurality of assumed road surfaces, for which the lateral acceleration estimated by said lateral acceleration estimation means differs least from a lateral acceleration detected, among the lateral accelerations estimated by said lateral acceleration estimation means for the respective assumed road surfaces.

12. A vehicle running condition detection device according to claim 9, wherein the plurality of assumed road surfaces include at least any of a dry road, a snow covered road, and an icy road.

13. A vehicle running condition detection device, comprising:
   detection means for detecting a state quantity concerning motion of a vehicle;
   memory means for storing non-linear tire characteristics for each of a plurality of assumed road surfaces;
   calculation means for estimating a quantity concerning a vehicle running condition for each of the plurality of assumed road surfaces based on the state quantity and the non-linear tire characteristics; and
   limit condition judgment means for judging whether or not the vehicle is under a limit condition through comparison between a predetermined limit value and the quantity estimated by said calculation means corresponding to an actual road surface condition, the quantity being selected from quantities estimated by said calculation means for the respective assumed road surfaces.

14. A vehicle running condition detection device according to claim 13, wherein the non-linear tire characteristics show non-saturated characteristics.

15. A vehicle running condition detection device according to claim 14, wherein the quantity concerning the vehicle running condition is a vehicle lateral acceleration.

16. A vehicle running condition detection device according to claim 14, wherein the actual road surface condition is determined through comparison between quantities concerning a vehicle running condition estimated by said calculation means for the respective assumed road surfaces and detected quantity concerning a vehicle running condition.

17. A vehicle running condition detection device according to claim 14, wherein the plurality of assumed road surfaces include at least any of a dry road, a snow covered road, and an icy road.

* * * * *